US012769373B2

(12) United States Patent
Wu et al.

(10) Patent No.: US 12,769,373 B2
(45) Date of Patent: Oct. 20, 2026

(54) FOLDABLE ELECTRONIC DEVICE AND HINGE MECHANISM THEREOF

(71) Applicant: Huawei Technologies Co., Ltd., Shenzhen (CN)

(72) Inventors: Weifeng Wu, Dongguan (CN); Ding Zhong, Dongguan (CN); Qiang Zhan, Dongguan (CN); Leilei Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 19/025,301

(22) Filed: Jan. 16, 2025

(65) Prior Publication Data

US 2025/0155938 A1 May 15, 2025

Related U.S. Application Data

(63) Continuation of application No. PCT/CN2023/108724, filed on Jul. 21, 2023.

(30) Foreign Application Priority Data

Oct. 17, 2022 (CN) ......................... 202211268966.4

(51) Int. Cl.
*G06F 1/16* (2006.01)
*F16C 11/10* (2006.01)

(52) U.S. Cl.
CPC ............ *G06F 1/1681* (2013.01); *F16C 11/10* (2013.01); *G06F 1/1616* (2013.01); *G06F 1/1652* (2013.01)

(58) Field of Classification Search
CPC ...................................................... G06F 1/1681
See application file for complete search history.

(56) References Cited

U.S. PATENT DOCUMENTS

2018/0239400 A1* 8/2018 Lin ........................ G06F 1/1616
2020/0117245 A1* 4/2020 Ou ...................... H04M 1/0216

FOREIGN PATENT DOCUMENTS

CN 113833741 A 12/2021

* cited by examiner

*Primary Examiner* — Jerry Wu
(74) *Attorney, Agent, or Firm* — Conley Rose, P.C.

(57) ABSTRACT

A foldable electronic device includes a first housing, a second housing, a hinge mechanism, a flexible display, and an end cover. The first housing and the second housing are unfolded and folded relative to each other via the hinge mechanism. The flexible display continuously covers the first housing, the second housing, and the hinge mechanism, and is fastened to the first housing and the second housing. The hinge mechanism includes a base, and at least a part of the base can be accommodated in a first accommodating groove of the end cover. A side that is of the first housing and that is away from the flexible display is provided with a first appearance surface, and the base is provided with a first arc-shaped groove.

19 Claims, 24 Drawing Sheets

FOLDABLE ELECTRONIC DEVICE AND HINGE MECHANISM THEREOF

CROSS-REFERENCE TO RELATED APPLICATIONS

This is a continuation of International Patent Application No. PCT/CN2023/108724 filed on Jul. 21, 2023, which claims priority to Chinese Patent Application No. 202211268966.4 filed on Oct. 17, 2022, all of which are hereby incorporated by reference in their entireties.

TECHNICAL FIELD

This application relates to the field of electronic device technologies, and in particular, to a foldable electronic device and a hinge mechanism thereof.

BACKGROUND

As flexible display technologies are gradually mature, a display mode of an electronic device is greatly changed. A mobile phone with a foldable flexible display, a tablet computer with a foldable flexible display, a wearable electronic device with a foldable flexible display, and the like are an important evolution direction of future intelligent electronic devices.

A flexible display, as a key component of a foldable electronic device, is characterized by continuity and foldability. As an important component for implementing a folding function of the foldable electronic device, when the foldable electronic device is in a folded state, a hinge mechanism may form display accommodating space for accommodating a bent part of the flexible display, to avoid pulling or squeezing the flexible display. In a current foldable electronic device, to enable a hinge mechanism to form display accommodating space that meets a display accommodating requirement, the hinge mechanism is usually designed symmetrically, so that the electronic device is designed symmetrically. However, this makes a structure of the foldable electronic device complex.

SUMMARY

This application provides a foldable electronic device and a hinge mechanism thereof, to simplify a structure of the hinge mechanism, and simplify a structure of the electronic device.

According to a first aspect, this application provides an electronic device. The electronic device is a foldable electronic device, and may include a first housing, a second housing, a hinge mechanism, a flexible display, and an end cover. The first housing and the second housing are respectively disposed on two opposite sides of the hinge mechanism, and the first housing and the second housing can be unfolded and folded relative to each other via the hinge mechanism. The flexible display can continuously cover the first housing, the second housing, and the hinge mechanism, and the flexible display can be fastened to the first housing and the second housing. In this way, in a process in which the first housing and the second housing rotate relative to the hinge mechanism, the flexible display may be bent accordingly, and a bent part of the flexible display is disposed corresponding to the hinge mechanism. In addition, the first housing includes a first appearance surface, and the first appearance surface is a surface that is of the first housing and that is away from the flexible display. The hinge mechanism may include a base, and the base may be provided with a first arc-shaped groove. A surface that is of the end cover and that faces the flexible display is provided with a first accommodating groove, and at least a part of the base may be accommodated in the first accommodating groove, so that the end cover may protect the base. When the electronic device is in the folded state and the unfolded state, the first appearance surface may be in lap joint with a groove surface of the first accommodating groove, so that a complete appearance surface can be provided between the first housing and the end cover in the state. In addition, when the electronic device is switched between the folded state and the unfolded state, at least a part of the first housing may rotate in the first arc-shaped groove. With this design, the first housing may have a simple structure and small weight, so that a structure of the electronic device may be simplified.

In addition, in this application, the second housing is provided with a second appearance surface, and the second appearance surface is located on a side that is of the second housing and that is away from the flexible display. A spacing between the first appearance surface and the flexible display is less than a spacing between the second appearance surface and the flexible display. Such a design can enable the first housing and the second housing to have unequal structures, and a thickness of the first housing to be small, and therefore implement a thinning design of the first housing, simplify a structure of the first housing, and help implement a simplified design of the electronic device.

In the electronic device provided in this application, the second housing may be provided with a second accommodating groove, the end cover is provided with a third appearance surface, and the third appearance surface is a surface that is of the end cover and that is away from the base. When the electronic device is in the folded state and the unfolded state, the third appearance surface may be in lap joint with a groove surface of the second accommodating groove, so that a complete appearance surface can be provided between the second housing and the end cover in the state. Therefore, the electronic device provided in this application has a complete appearance surface in the folded state and the unfolded state. This helps improve appearance aesthetics of the electronic device.

The hinge mechanism is a key component for implementing rotation of the electronic device. During specific disposition, the hinge mechanism may further include a main shaft module. The main shaft module includes a first rotating assembly and a second rotating assembly. The first rotating assembly and the second rotating assembly are respectively disposed on two opposite sides of the base. The first rotating assembly may include a first support plate, the first support plate is rotatably connected to the base, and the first support plate is fastened to the first housing, so that the first housing is rotatably connected to the base through the first support plate. The second rotating assembly may include a first support arm and a housing mounting bracket. The first support arm is rotatably connected to the base, the housing mounting bracket is fastened to the second housing, and the first support arm is slidably connected to the housing mounting bracket, so that the second housing is rotatably connected to the base through the first support plate.

In a possible implementation of this application, the first support plate includes a first plate surface, the first plate surface is configured to support the flexible display, and the flexible display may be bonded to the first plate surface of the first support plate. Specifically, the flexible display may be bonded to a part of an area on the first plate surface. Therefore, when the electronic device is in the unfolded state, the first housing, the second housing, and the first support plate together can smoothly support the flexible display. In a process in which the electronic device changes from the unfolded state to the folded state, the first support plate can drive the flexible display to rotate. This can effectively avoid deformation of the flexible display, to reduce a risk of damage to the flexible display. In addition, when the electronic device is in the folded state, the flexible display may be attached to the first support plate. This can help improve light and shadow of the flexible display.

In addition, in a possible implementation of this application, a first arc-shaped rotating block is disposed at an end that is of the first support plate and that is rotatably connected to the base, to implement a rotatable connection between the first support plate and the base. The first arc-shaped rotating block may be accommodated in the first arc-shaped groove, and may rotate along an arc-shaped surface of the first arc-shaped groove, so that the first support plate is rotatably connected to the base through a virtual shaft. This helps reduce space occupied by the first support plate on the base, facilitates a narrowing design of the hinge mechanism, and helps implement a miniaturization design of the electronic device.

In this application, the first rotating member may further include a first rotating member, the first support plate is provided with a notch, at least a part of the first rotating member may be accommodated in the notch, the first support plate is rotatably connected to the first rotating member through a first rotating shaft, and the first support arm is rotatably connected to the first rotating member. In addition, a rotation center line on which the first support plate is rotatably connected to the base is a first axis, a rotation center line on which the first support plate is rotatably connected to the first rotating member is a second axis, and the first axis and the second axis are spaced apart; and a rotation center line on which the first support arm is rotatably connected to the base is a third axis, a rotation center line on which the first support arm is rotatably connected to the first rotating member is a fourth axis, and the third axis and the fourth axis are spaced apart. In this way, when the first housing and the second housing are folded relative to each other, the first support arm rotates around the base, and the first rotating member moves toward the first support plate, so that the first support plate rotates around the base, and the first support plate and the first support arm rotate toward each other. However, when the first housing and the second housing are unfolded relative to each other, the first support arm rotates around the base, and the first rotating member moves toward the first support arm, so that the first support plate is pulled by the first rotating member to rotate around the base. In addition, the first support plate and the first support arm rotate away from each other, to implement synchronous reverse motion of the first rotating assembly and the second rotating assembly. Therefore, synchronous reverse motion of the first housing and the second housing in a process of unfolding and folding the electronic device can be implemented. This can help improve consistency of forces applied by the first housing and the second housing on the flexible display, thereby effectively reducing a risk of damage to the flexible display.

In a possible implementation of this application, the first rotating assembly may further include a first elastic piece, and the first elastic piece is sleeved on the first rotating shaft. In addition, in an axial direction of the first rotating shaft, the first support plate may be further provided with a first cam surface, and the first rotating member may be provided with a second cam surface. In this way, under the action of the first elastic piece, the first cam surface may abut against the second cam surface, to generate a damping force in a process in which the first support plate and the first rotating member rotate relative to each other. When the hinge mechanism is used in the electronic device, the damping force may make a user feel obvious in a process of folding the electronic device, and user experience may be improved.

To improve motion stability of the second rotating assembly, the second rotating assembly may further include a second support arm. The second support arm is rotatably connected to the base, and the second support arm is slidably connected to the housing mounting bracket, so that the first support arm and the second support arm jointly drive the second housing to rotate. This helps improve motion stability of the second housing.

In this application, the first rotating assembly may further include a second rotating member, and at least a part of the second rotating member may be accommodated in the notch of the first support plate. The second rotating member may be rotatably connected to the first support plate through the first rotating shaft. In this case, the first rotating member, the second rotating member, and the first support plate are rotatably connected through the first rotating shaft, that is, a rotation center line on which the first supporting plate is rotatably connected to the second rotating member coincides with a rotation center line on which the first supporting plate is rotatably connected to the first rotating member. In addition, the second support arm is rotatably connected to the second rotating member. In addition, a rotation center line on which the second support arm is rotatably connected to the base is a fifth axis, a rotation center line on which the second support arm is rotatably connected to the second rotating member is a sixth axis, and the fifth axis and the sixth axis are spaced apart. In this way, when the first housing and the second housing are folded relative to each other, the second support arm rotates around the base, and the second rotating member moves toward the first support plate, so that the first support plate is pushed by the second rotating member to rotate around the base, and the first support plate and the second support arm rotate toward each other. When the first housing and the second housing are unfolded relative to each other, the second support arm rotates around the base, and the second rotating member moves toward the second support arm, so that the first support plate is pulled by the second rotating member to rotate around the base. In addition, the first support plate and the second support arm rotate away from each other, to implement synchronous reverse motion of the first rotating assembly and the second rotating assembly.

In addition, in the axial direction of the first rotating shaft, the first support plate may be provided with a third cam surface, the second rotating member may be provided with a fourth cam surface, and the third cam surface may abut against the fourth cam surface, to generate a damping force in a process in which the first support plate and the second rotating member rotate relative to each other. In this way, in a process in which the first support plate rotates around the base, two pairs of damping forces are applied to the first rotating assembly. This can improve user experience in a use process.

The first elastic piece mentioned above in this application may also act on the second rotating member, so that the third cam surface tightly abuts against the fourth cam surface under the elastic force of the first elastic piece, to increase a damping force in a relative rotation process of the first support plate and the second rotating member.

To improve motion consistency between the first support arm and the second support arm, the first support arm and the second support arm may be rotatably connected to the base through the second rotating shaft.

It can be learned from the foregoing description that a damping force may be generated through fitting of the cam surfaces. Based on this, the second rotating assembly may also be appropriately designed, so that a damping force also exists in a rotation process of the second rotating assembly. During specific implementation, in a possible implementation of this application, the base may further include a first cam member, the first cam member may be rotatably connected to the first support arm through the second rotating shaft, and the first cam member may be connected to the base through a third rotating shaft. In this way, there may be no rotation relationship between the first cam member and the base.

In addition, the second rotating member may include a second elastic piece, and the second elastic piece is sleeved on the second rotating shaft. In an axial direction of the second rotating shaft, the first support arm is provided with a fifth cam surface, and the fifth cam surface is disposed facing the second support arm; the first cam member may be provided with a sixth cam surface, and the sixth cam surface is disposed away from the second support arm; and under the elastic force of the second elastic piece, the fifth cam surface may abut against the sixth cam surface. In this way, in a process in which the first support arm rotates relative to the base, a damping force may be generated between the first support arm and the base.

In a possible implementation of this application, the base may further include a second cam member, the second cam member is rotatably connected to the second support arm through the second rotating shaft, and the second cam member may be rotatably connected to the first cam member through the third rotating shaft. In addition, in the axial direction of the second rotating shaft, the second support arm may be provided with a seventh cam surface, and the seventh cam surface is disposed facing the first support arm; and the second cam member may be provided with an eighth cam surface, and the eighth cam surface is disposed away from the first support arm. Therefore, under the action of the second elastic piece, the seventh cam surface may abut against the eighth cam surface. In this way, in a process in which the second support arm rotates relative to the base, a damping force may be generated between the second support arm and the base.

In a possible implementation of this application, the base may further include a first damping support and a second damping support. The first cam member abuts against the first damping support, and the second cam member abuts against the second damping support, to limit the first cam member and the second cam member in the axial direction.

To implement abutting between the first cam member and the first damping support and abutting between the second cam member and the second damping support, the base may further include a third elastic piece, and the third elastic piece may be sleeved on the third rotating shaft. Therefore, under the elastic force of the third elastic piece, the first cam member abuts against the first damping support, and the second cam member abuts against the second damping support.

In this application, a first end of the second rotating shaft may be clamped to the first damping support for limiting, and a second end of the second rotating shaft may be clamped to the second damping support for limiting, to limit the second rotating shaft in the axial direction. Similarly, a first end of the third rotating shaft may be clamped to the first damping support for limiting, and a second end of the third rotating shaft may be clamped to the second damping support for limiting, to limit the third rotating shaft in an axial direction.

In addition, both the first end of the second rotating shaft and the first end of the third rotating shaft may be clamped to a first limiting sheet, and the first limiting sheet abuts against the first damping support, so that the first end of the second rotating shaft and the first end of the third rotating shaft are connected to the first damping support. Similarly, both the second end of the second rotating shaft and the second end of the third rotating shaft may be clamped to a second limiting sheet, and the second limiting sheet abuts against the second damping support, so that the second end of the second rotating shaft and the second end of the third rotating shaft are connected to the second damping support.

In a possible implementation of this application, in the axial direction of the second rotating shaft, the second damping support may be further provided with a ninth cam surface, and the ninth cam surface is disposed facing the second support arm; the second support arm may be further provided with a tenth cam surface, and the tenth cam surface is disposed away from the first support arm; and under the action of the second elastic piece, the ninth cam surface may abut against the tenth cam surface. In this way, in a process in which the second support arm rotates relative to the base, a damping force may be generated between the second support arm and the base.

In a possible implementation of this application, the base may include a bearing surface, and the bearing surface may be configured to support the flexible display. The second rotating assembly includes a second support plate and a swing arm, the second support plate is rotatably connected to the housing mounting bracket, the second support plate includes a second plate surface, and the second plate surface is configured to support the flexible display.

The swing arm may be rotatably connected to the base, and a rotation axis of the first support arm and a rotation axis of the swing arm are parallel and do not coincide. Therefore, phase difference motion effect between the swing arm and the first support arm can be implemented, so that in the rotation process of the hinge mechanism, the second rotating assembly performs a telescopic motion relative to the base, to adapt to a length of the flexible display. This avoids pulling or squeezing the flexible display, reduces a risk of damage to the flexible display, and prolongs a service life of the flexible display.

In addition, in a process in which the first rotating assembly rotates around the base, a relative distance between the first rotating assembly and the base does not extend. In this way, a structure design on a side of the first rotating assembly of the hinge mechanism may be simple, and occupied space is small. This helps reduce a volume of the entire hinge mechanism, and implement a miniaturization and thin design of the electronic device.

In a possible implementation of this application, the swing arm is slidably connected to the housing mounting bracket. The housing mounting bracket may be provided with a first sliding groove extending in a first direction and a third sliding groove extending in a second direction, the first support arm is slidable in the first sliding groove, and the swing arm is slidable in the third sliding groove. In addition, a projection along the first direction in a first cross section is not parallel to a projection along the second direction in the first cross section. The first cross section is a reference plane perpendicular to the rotation axis of the first support arm and the rotation axis of the swing arm. In this way, angles at which the first support arm and the swing arm rotate relative to the base are adjusted by appropriately designing providing directions of the first sliding groove and the third sliding groove. For example, neither the rotation angle of the first support arm nor the rotation angle of the swing arm may be greater than 90°. Therefore, the angles at which the first support arm and the swing arm rotate relative to the base can be small, so that another structure on the hinge mechanism can be prevented from avoiding rotation of the swing arm. This can help increase a wall thickness of a local structure of the swing arm, and improve structural reliability of the swing arm. In addition, when being used in the electronic device, the hinge mechanism can effectively avoid a case in which a component in the electronic device is thinned, to avoid rotation of the swing arm. This can improve reliability of an overall structure of the electronic device, and can reduce a risk of squeezing the flexible display of the electronic device due to rotation of the swing arm, reduce the risk of damage to the flexible display, and prolong the service life of the flexible display.

In the foregoing design manner, when the hinge mechanism is in the folded state, an included angle between the first plate surface and the bearing surface may be greater than an included angle between the second plate surface and the bearing surface, to form, among the first plate surface, the second plate surface, and the bearing surface, display accommodating space for accommodating a bendable part of the flexible display. Herein, the folded state of the hinge mechanism definitely indicates that the two rotating assemblies of the hinge mechanism are seamlessly attached to each other, but indicates a state corresponding to the hinge mechanism when the electronic device is in the folded state.

In the hinge mechanism provided in this application, the first rotating assembly and the second rotating assembly are asymmetrically disposed relative to each other or relative to the base. The hinge mechanism can be used to form, among the first support plate, the second support plate, and the base, triangular display accommodating space that tilts toward a side of the first support plate. When the hinge mechanism is used in the electronic device, the bendable part of the flexible display of the electronic device can be accommodated in the display accommodating space, and is in an eccentric water-drop-like form. This can prevent the flexible display from being squeezed, effectively reduce a width of a bent area of the flexible display while reducing a risk of damage to the flexible display, and help improve user experience. In addition, because two sides of the hinge mechanism do not need to be in totally same structures, a structure design on one side of the hinge structure can be simplified, and an overall structure of the hinge mechanism can be simplified based on such a design.

There is a plurality of implementations of the rotatable connection between the second support plate and the housing mounting bracket. In a possible implementation of this application, a rotating slot may be provided on the housing mounting bracket, and a rotating part may be disposed on the first support plate. In this way, the rotating part may be mounted in the rotating slot, and the rotating part may rotate along a slot surface of the rotating slot.

In addition, when the second rotating assembly includes the second support arm, the housing mounting bracket may be further provided with a second sliding groove extending in the first direction, and the second support arm may slide in the second sliding groove. In this way, an angle at which the second support arm rotates relative to the base is adjusted by appropriately designing the providing direction of the second sliding groove. For example, a rotation angle of the second support arm may be not greater than 90°.

In another possible implementation of this application, the swing arm may be rotatably connected to the housing mounting bracket. In this solution, a connecting rod-sliding block mechanism is formed between the first support arm and the swing arm. In a process in which the electronic device changes from the folded state to an unfolded state, a rotation angle of the first support arm may be 90°, but a rotation angle of the swing arm needs to be greater than 90°.

According to a second aspect, this application further provides a hinge mechanism. The hinge mechanism may be used in a foldable electronic device, the hinge mechanism is disposed corresponding to a bendable part of a flexible display of the electronic device, and the electronic device is unfolded or folded via the hinge mechanism. When the hinge mechanism is specifically disposed, the hinge mechanism may include a base and a main shaft module. The main shaft module includes a first rotating assembly and a second rotating assembly, and the first rotating assembly and the second rotating assembly are respectively located on two opposite sides of the base. The first rotating assembly may include a first support plate and a first rotating member, the first support plate is provided with a notch, at least a part of the first rotating member may be accommodated in the notch, and the first support plate is rotatably connected to the first rotating member through a first rotating shaft. The second rotating assembly may include a first support arm, the first support arm is rotatably connected to the base, and the first support arm is rotatably connected to the first rotating member. In addition, a rotation center line on which the first support plate is rotatably connected to the base is a first axis, a rotation center line on which the first support plate is rotatably connected to the first rotating member is a second axis, and the first axis and the second axis are spaced apart; and a rotation center line on which the first support arm is rotatably connected to the base is a third axis, a rotation center line on which the first support arm is rotatably connected to the first rotating member is a fourth axis, and the third axis and the fourth axis are spaced apart. In this way, when the first rotating assembly and the second rotating assembly are folded relative to each other, the first support arm rotates around the base, and the first rotating member moves toward the first support plate, so that the first support plate is pushed by the first rotating member to rotate around the base, and the first support plate and the first support arm rotate toward each other. In addition, when the first rotating assembly and the second rotating assembly are unfolded relative to each other, the first support arm rotates around the base, and the first rotating member moves toward the first support arm, so that the first support plate is pulled by the first rotating member to rotate around the base. In addition, the first support plate and the first support arm rotate away from each other, to implement synchronous reverse motion of the first rotating assembly and the second rotating assembly.

In a possible implementation of this application, the base may be provided with a first arc-shaped groove, and a first arc-shaped rotating block is disposed at an end that is of the first support plate and that is rotatably connected to the base, to implement a rotatable connection between the first support plate and the base. The first arc-shaped rotating block may be accommodated in the first arc-shaped groove, and may rotate along an arc-shaped surface of the first arc-shaped groove, so that the first support plate is rotatably connected to the base through a virtual shaft. This helps reduce space occupied by the first support plate on the base, facilitates a narrowing design of the hinge mechanism, and helps implement a miniaturization design of the electronic device.

In a possible implementation of this application, the first rotating assembly may further include a first elastic piece, and the first elastic piece is sleeved on the first rotating shaft. In addition, in an axial direction of the first rotating shaft, the first support plate may be further provided with a first cam surface, and the first rotating member may be provided with a second cam surface. In this way, under the action of the first elastic piece, the first cam surface may abut against the second cam surface, to generate a damping force in a process in which the first support plate and the first rotating member rotate relative to each other. When the hinge mechanism is used in the electronic device, the damping force may make a user feel obvious in a process of folding the electronic device, and user experience may be improved.

To improve motion stability of the second rotating assembly, the second rotating assembly may further include a second support arm. The second support arm is rotatably connected to the base, and the first support arm and the second support arm jointly drive one housing of the electronic device to rotate. This helps improve motion stability of the housing.

In this application, the first rotating assembly may further include a second rotating member, and at least a part of the second rotating member may be accommodated in the notch of the first support plate. The second rotating member may be rotatably connected to the first support plate through the first rotating shaft. In this case, the first rotating member, the second rotating member, and the first support plate are rotatably connected through the first rotating shaft, that is, a center line on which the first supporting plate is rotatably connected to the second rotating member coincides with a center line on which the first supporting plate is rotatably connected to the first rotating member. In addition, the second support arm is rotatably connected to the second rotating member. In addition, a rotation center line on which the second support arm is rotatably connected to the base is a fifth axis, a rotation center line on which the second support arm is rotatably connected to the second rotating member is a sixth axis, and the fifth axis and the sixth axis are spaced apart. In this way, when the first rotating assembly and the second rotating assembly are folded relative to each other, the second support arm rotates around the base, and the second rotating member moves toward the first support plate, so that the first support plate is pushed by the second rotating member to rotate around the base, and the first support plate and the second support arm rotate toward each other. In addition, when the first rotating assembly and the second rotating assembly are unfolded relative to each other, the second support arm rotates around the base, and the second rotating member moves toward the second support arm, so that the first support plate is pulled by the second rotating member to rotate around the base. In addition, the first support plate and the second support arm rotate away from each other, to implement synchronous reverse motion of the first rotating assembly and the second rotating assembly.

In addition, in the axial direction of the first rotating shaft, the first support plate may be provided with a third cam surface, the second rotating member may be provided with a fourth cam surface, and the third cam surface may abut against the fourth cam surface, to generate a damping force in a process in which the first support plate and the second rotating member rotate relative to each other. In this way, in a process in which the first support plate rotates around the base, two pairs of damping forces are applied to the first rotating assembly. This can improve user experience in a use process.

The first elastic piece mentioned above in this application may also act on the second rotating member, so that the third cam surface is in tight fitting to the fourth cam surface under the elastic force of the first elastic piece, to increase a damping force in a relative rotation process of the first support plate and the second rotating member.

To improve motion consistency between the first support arm and the second support arm, the first support arm and the second support arm may be rotatably connected to the base through the second rotating shaft.

It can be learned from the foregoing description that a damping force may be generated through fitting of the cam surfaces. Based on this, the second rotating assembly may also be appropriately designed, so that a damping force also exists in a rotation process of the second rotating assembly. During specific implementation, in a possible implementation of this application, the base may further include a first cam member, the first cam member may be rotatably connected to the first support arm through the second rotating shaft, and the first cam member may be connected to the base through a third rotating shaft. In this way, there may be no rotation relationship between the first cam member and the base.

In addition, the second rotating member may include a second elastic piece, and the second elastic piece is sleeved on the second rotating shaft. In an axial direction of the second rotating shaft, the first support arm is provided with a fifth cam surface, and the fifth cam surface is disposed facing the second support arm. The first cam member may be provided with a sixth cam surface, and the sixth cam surface is disposed away from the second support arm. Under the elastic force of the second elastic piece, the fifth cam surface may abut against the sixth cam surface. In this way, in a process in which the first support arm rotates relative to the base, a damping force may be generated between the first support arm and the base.

In a possible implementation of this application, the base may further include a second cam member, the second cam member may be rotatably connected to the first cam member through the third rotating shaft, and the second cam member is rotatably connected to the second support arm through the second rotating shaft. In addition, in the axial direction of the second rotating shaft, the second support arm may be provided with a seventh cam surface, and the seventh cam surface is disposed facing the first support arm. The second cam member may be provided with an eighth cam surface, and the eighth cam surface is disposed away from the first support arm. Under the elastic force of the second elastic piece, the seventh cam surface may abut against the eighth cam surface. In this way, in a process in which the second support arm rotates relative to the base, a damping force may be generated between the second support arm and the base.

In a possible implementation of this application, the base may further include a first damping support and a second damping support. The first cam member abuts against the first damping support, and the second cam member abuts against the second damping support, to limit the first cam member and the second cam member in the axial direction.

To implement abutting between the first cam member and the first damping support and abutting between the second cam member and the second damping support, the base may further include a third elastic piece, and the third elastic piece may be sleeved on the third rotating shaft. Therefore, under the elastic force of the third elastic piece, the first cam member abuts against the first damping support, and the second cam member abuts against the second damping support.

In this application, a first end of the second rotating shaft may be clamped to the first damping support for limiting, and a second end of the second rotating shaft may be clamped to the second damping support for limiting, to limit the second rotating shaft in the axial direction. Similarly, a first end of the third rotating shaft may be clamped to the first damping support for limiting, and a second end of the third rotating shaft may be clamped to the second damping support for limiting, to limit the third rotating shaft in an axial direction.

In addition, both the first end of the second rotating shaft and the first end of the third rotating shaft may be clamped to a first limiting sheet, and the first limiting sheet abuts against the first damping support, so that the first end of the second rotating shaft and the first end of the third rotating shaft are connected to the first damping support. Similarly, both the second end of the second rotating shaft and the second end of the third rotating shaft may be clamped to a second limiting sheet, and the second limiting sheet abuts against the second damping support, so that the second end of the second rotating shaft and the second end of the third rotating shaft are connected to the second damping support.

In a possible implementation of this application, in the axial direction of the second rotating shaft, the second damping support may be further provided with a ninth cam surface, and the second support arm may be further provided with a tenth cam surface. Therefore, under the action of the second elastic piece, the ninth cam surface may abut against the tenth cam surface. In this way, in a process in which the second support arm rotates relative to the base, a damping force may be generated between the second support arm and the base.

In a possible implementation of this application, the base may include a bearing surface, and the bearing surface may be configured to support the flexible display. The first support plate may include a first plate surface, and the first plate surface is configured to support the flexible display. In addition, the second rotating assembly includes a second support plate, a housing mounting bracket, and a swing arm. The second support plate is rotatably connected to the housing mounting bracket, the second support plate includes a second plate surface, and the second plate surface is configured to support the flexible display.

The swing arm may be rotatably connected to the base, and a rotation axis of the first support arm and a rotation axis of the swing arm are parallel and do not coincide. Therefore, phase difference motion effect between the swing arm and the first support arm can be implemented, so that in the rotation process of the hinge mechanism, the second rotating assembly performs a telescopic motion relative to the base, to adapt to a length of the flexible display. This avoids pulling or squeezing the flexible display, reduces a risk of damage to the flexible display, and prolongs a service life of the flexible display.

In addition, in a process in which the first rotating assembly rotates around the base, a relative distance between the first rotating assembly and the base does not extend. In this way, a structure design on a side of the first rotating assembly of the hinge mechanism may be simple, and occupied space is small. This helps reduce a volume of the entire hinge mechanism, and implement a miniaturization and thin design of the electronic device.

In a possible implementation of this application, the first support arm is slidably connected to the housing mounting bracket, and the swing arm is slidably connected to the housing mounting bracket. The housing mounting bracket may be provided with a first sliding groove extending in a first direction and a third sliding groove extending in a second direction, the first support arm is slidable in the first sliding groove, and the swing arm is slidable in the third sliding groove. In addition, a projection along the first direction in a first cross section is not parallel to a projection along the second direction in the first cross section. The first cross section is a reference plane perpendicular to the rotation axis of the first support arm and the rotation axis of the swing arm. In this way, angles at which the first support arm and the swing arm rotate relative to the base are adjusted by appropriately designing providing directions of the first sliding groove and the third sliding groove. For example, neither the rotation angle of the first support arm nor the rotation angle of the swing arm may be greater than 90°. Therefore, the angles at which the first support arm and the swing arm rotate relative to the base can be small, so that another structure on the hinge mechanism can be prevented from avoiding rotation of the swing arm. This can help increase a wall thickness of a local structure of the swing arm, and improve structural reliability of the swing arm. In addition, when being used in the electronic device, the hinge mechanism can effectively avoid a case in which a component in the electronic device is thinned, to avoid rotation of the swing arm. This can improve reliability of an overall structure of the electronic device, and can reduce a risk of squeezing the flexible display of the electronic device due to rotation of the swing arm, reduce the risk of damage to the flexible display, and prolong the service life of the flexible display.

In the foregoing design manner, when the hinge mechanism is in the folded state, an included angle between the first plate surface and the bearing surface may be greater than an included angle between the second plate surface and the bearing surface, to form, among the first plate surface, the second plate surface, and the bearing surface, display accommodating space for accommodating a bendable part of the flexible display. Herein, the folded state of the hinge mechanism definitely indicates that the two rotating assemblies of the hinge mechanism are seamlessly attached to each other, but indicates a state corresponding to the hinge mechanism when the electronic device is in the folded state.

In the hinge mechanism provided in this application, the first rotating assembly and the second rotating assembly are asymmetrically disposed relative to each other or relative to the base. The hinge mechanism can be used to form, among the first support plate, the second support plate, and the base, triangular display accommodating space that tilts toward a side of the first support plate. When the hinge mechanism is used in the electronic device, the bendable part of the flexible display of the electronic device can be accommodated in the display accommodating space, and is in an eccentric water-drop-like form. This can prevent the flexible display from being squeezed, effectively reduce a width of a bent area of the flexible display while reducing a risk of damage to the flexible display, and help improve user experience. In addition, because two sides of the hinge mechanism do not need to be in totally same structures, a structure design on one side of the hinge structure can be simplified, and an overall structure of the hinge mechanism can be simplified based on such a design.

There are a plurality of implementations of the rotatable connection between the second support plate and the housing mounting bracket. In a possible implementation of this application, a rotating slot may be provided on the housing mounting bracket, and a rotating part may be disposed on the first support plate. In this way, the rotating part may be mounted in the rotating slot, and the rotating part may rotate along a slot surface of the rotating slot.

In addition, when the second rotating assembly includes the second support arm, the housing mounting bracket may be further provided a second sliding groove extending in the first direction, and the second support arm may slide in the second sliding groove. In this way, an angle at which the second support arm rotates relative to the base is adjusted by appropriately designing the providing direction of the second sliding groove. For example, a rotation angle of the second support arm may be not greater than 90°.

In another possible implementation of this application, the swing arm may be rotatably connected to the housing mounting bracket. In this solution, a connecting rod-sliding block mechanism is formed between the first support arm and the swing arm. In a process in which the electronic device changes from the folded state to an unfolded state, a rotation angle of the first support arm may be 90°, but a rotation angle of the swing arm needs to be greater than 90°.

REFERENCE NUMERALS

1: hinge mechanism; 101: main shaft module; 1011: first rotating assembly; 10111: first support plate; 101111: notch;

101112: first cam surface; 101113: third cam surface; 101114: first plate surface; 101115: second plate surface;

101116: first arc-shaped rotating block; 10112: first rotating member; 101121: second cam surface; 10113: first rotating shaft;
10114: first elastic piece; 10115: second rotating member; 101151: fourth cam surface;
1012: second rotating assembly; 10121: first support arm; 101211: first sliding block; 101212: fifth cam surface;
10122: first pin shaft; 10123: second support arm; 101231: seventh cam surface; 101232: tenth cam surface;
10124: second rotating shaft; **10124*a*: first end; 10124*b*: second end; 10125: second pin shaft; 10126**: second elastic piece;
10127: second support plate; 101271: third plate surface; 101272: fourth plate surface; 101273: rotating part;
101274: first guiding part; 1012741: first track slot;
10128: housing mounting bracket; 101281: first sliding groove; 1012811: first sliding rail; 101282: second sliding groove;
1012821: second sliding rail; 101283: third sliding groove; 1012831: third sliding rail; 101284: first surface;
101285: second surface; 101286: rotating slot; 101287: mounting part;
10129: swing arm; 101291: third sliding block; 101292: second arc-shaped rotating block; 101293: first guiding structure;
101294: mounting hole;
10130: drive connecting rod; 101301: first connection part; 101302: second connection part; 101303: first connecting rod;
101304: second connecting rod;
102: base; 1021: first damping support; 1022: second damping support; 10221: ninth cam surface;
1023: third rotating shaft; **1023*a*: first end; 1023*b*: second end; 1024: bearing surface; 1025**: second arc-shaped groove;
1026: first arc-shaped groove; 1027: third elastic piece;
103: first cam member; 1031: sixth cam surface; 104: second cam member; 1041: eighth cam surface;
105: first limiting sheet; 106: second limiting sheet; 107: display accommodating space;
108: end cover; 1081: first accommodating groove; 1082: third appearance surface;
2: first housing; 201: first appearance surface; 202: first support surface;
3: second housing; 301: second appearance surface; 302: second support surface; 303: second accommodating groove;
4: flexible display; 501: first axis; 502: second axis; 503: third axis; 504: fourth axis;
505: fifth axis; and 506: sixth axis.

DESCRIPTION OF EMBODIMENTS

To make the objectives, technical solutions, and advantages of this application clearer, the following further describes this application in detail with reference to the accompanying drawings.

Figure 1:
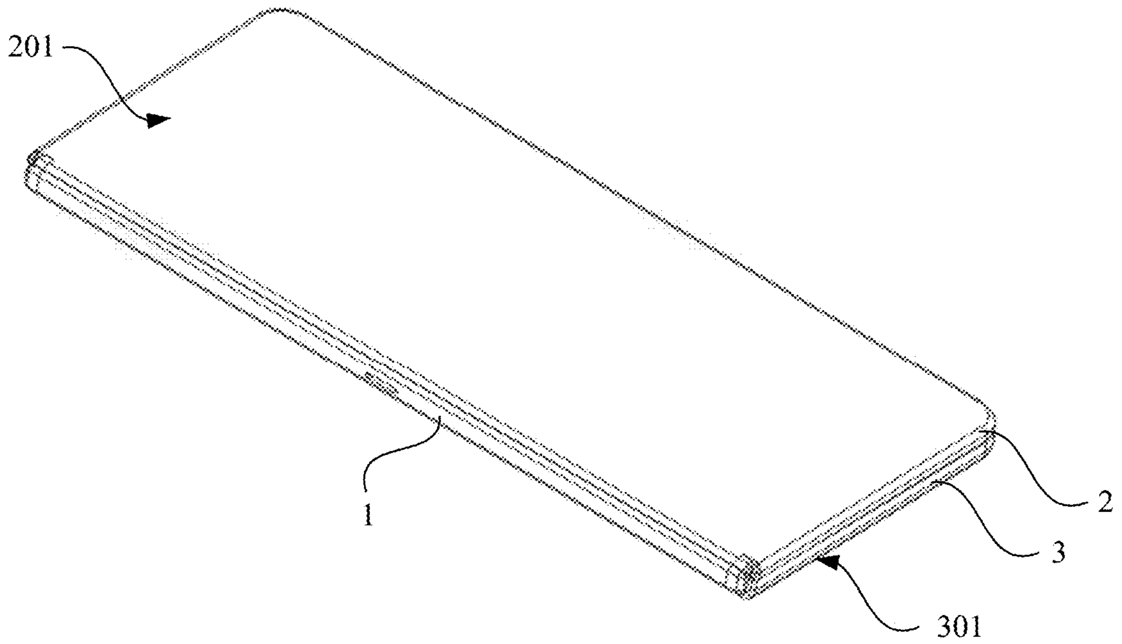
FIG. 1 is a diagram of a structure of an electronic device in a folded state according to an embodiment of this application.

For ease of understanding a hinge mechanism provided in embodiments of this application, the following first describes an application scenario of the hinge mechanism. Use of the hinge mechanism may be in, but is not limited to, a foldable electronic device like a mobile phone, a palmtop computer (personal digital assistant (PDA)), a notebook computer, or a tablet computer. When the hinge mechanism provided in embodiments of this application is used in an electronic device, refer to FIG. 1. FIG. 1 is a diagram of a structure of an electronic device according to an embodiment of this application. In addition to a hinge mechanism 1, the electronic device may further include two housings and a flexible display (not shown in FIG. 1). For ease of description, the two housings may be respectively named a first housing 2 and a second housing 3. The first housing 2 and the second housing 3 are located on two sides of the hinge mechanism 1, and can rotate around the hinge mechanism 1. When the electronic device is used, the electronic device may be folded and unfolded in different use scenarios. The electronic device provided in this application may be an inward-folded electronic device. In the embodiment shown in FIG. 1, the electronic device is in a folded state, and FIG. 1 shows a relative position relationship between the hinge mechanism 1 and the two housings when the electronic device is in the folded state. In this case, a surface of the hinge mechanism 1, a first appearance surface 201 of the first housing 2, and a second appearance surface 301 of the second housing 3 may be jointly used as an appearance surface of the electronic device. The first appearance surface 201 is a surface that is of the first housing 2 and that is away from the flexible display, and the second appearance surface 301 is a surface that is of the second housing 3 and that is away from the flexible display 4.

Figure 2:
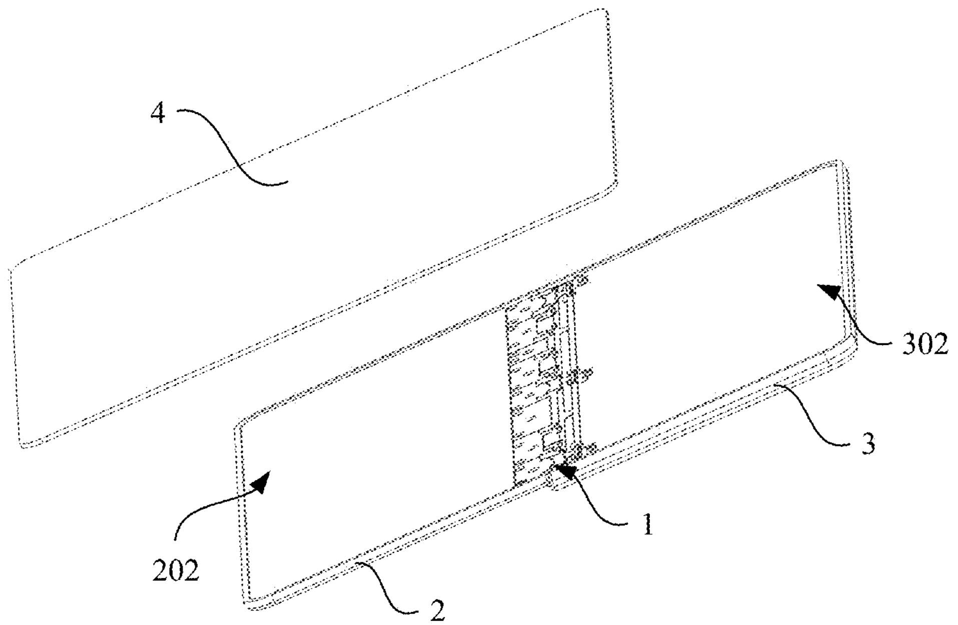
FIG. 2 is a diagram of a structure of an electronic device in an unfolded state according to an embodiment of this application.

In addition, FIG. 2 is a diagram of the structure of the electronic device in an unfolded state. The first housing 2 further includes a first support surface 202, and the first support surface 202 is a surface that is of the first housing 2 and that is configured to support the flexible display 4. The second housing 3 further includes a second support surface 302, and the second support surface 302 is a surface that is of the second housing 3 and that is configured to support the flexible display 4.

The flexible display 4 may continuously cover the first support surface 202 of the first housing 2, the second support surface 302 of the second housing 3, and the hinge mechanism 1. The hinge mechanism 1 is disposed corresponding to a bendable part of the flexible display 4. In addition, the flexible display 4 may be fastened to the first support surface 202 of the first housing 2 and the second support surface 302 of the second housing 3, and a connection manner may be but is not limited to bonding. Therefore, when the electronic device is in the unfolded state shown in FIG. 2, the first housing 2 and the second housing 3 may support the flexible display 4.

In a process in which the first housing 2 and the second housing 3 rotate from the unfolded state shown in FIG. 2 to the folded state shown in FIG. 1, or from the folded state shown in FIG. 1 to the unfolded state shown in FIG. 2, the flexible display 4 may be bent or flattened with the first housing 2 and the second housing 3.

It may be understood that a process of the electronic device from the unfolded state shown in FIG. 2 to the folded state shown in FIG. 1, or from the folded state shown in FIG. 1 to the unfolded state shown in FIG. 2 is the process of rotating the first housing 2 and the second housing 3 around the hinge mechanism 1. As a key functional component in the foldable electronic device, the hinge mechanism 1 may be disposed corresponding to a foldable part of the flexible display 4. Therefore, the hinge mechanism 1 is important in supporting the foldable part of the flexible display 4 in the unfolded state shown in FIG. 2 and in accommodating the foldable part of the flexible display 4 in the folded state shown in FIG. 1.

For example, when the electronic device is in the folded state shown in FIG. 1, if space formed between the first housing 2, the hinge mechanism 1, and the second housing 3 cannot meet a bending requirement of the flexible display 4, the flexible display 4 may be squeezed or pulled. As a result, after the electronic device performs a plurality of folding operations, the flexible display 4 is easily damaged.

Currently, when being specifically disposed, the existing hinge mechanism may include a base and two rotating assemblies, and the two rotating assemblies are symmetrically disposed relative to the base. Each rotating assembly may include a support arm, a swing arm, and a housing mounting bracket. Both the support arm and the swing arm may be rotatably connected to the base, the support arm may be slidably connected to the housing mounting bracket, the swing arm may be rotatably connected to the housing mounting bracket, and the housing mounting bracket may be fastened to a housing of the electronic device. For each rotating assembly, in a process in which the support arm and the swing arm rotate around the base, because a rotation axis of the support arm and a rotation axis of the swing arm do not coincide, a phase difference motion exists in the process in which the support arm and the swing arm rotate around the base, so that, in the process in which the hinge mechanism changes from the folded state shown in FIG. 1 to the unfolded state shown in FIG. 2 as the electronic device, an extension length of the housing mounting bracket relative to the base increases under the push of the swing arm, and a length of the hinge mechanism increases. However, in the process in which the hinge mechanism changes from the unfolded state shown in FIG. 2 to the folded state shown in FIG. 1, the extension length of the housing mounting bracket relative to the base decreases under the driving of the swing arm, and the length of the hinge mechanism decreases. In a rotation process of the hinge mechanism, the housing mounting bracket performs a telescopic motion relative to the base, so that the hinge mechanism can adapt to a length of the part that is of the flexible display and that is disposed corresponding to the hinge mechanism. This avoids pulling or squeezing the flexible display.

Figure 3:
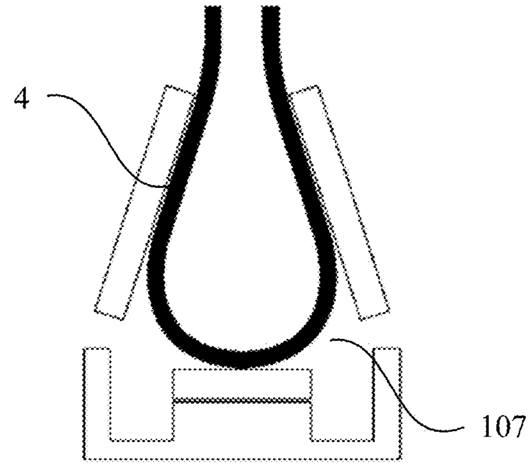
FIG. 3 is a diagram of a structure of display accommodating space formed by a hinge mechanism in another technology according to an embodiment of this application.

Because the current hinge mechanism is in a symmetric design manner, when the electronic device with the hinge mechanism is in the folded state, display accommodating space 107 that is formed at the hinge mechanism and that is used to accommodate the flexible display 4 is symmetric space shown in FIG. 3. However, a part, of the flexible display 4, accommodated in the display accommodating space 107 is in a bent state to form a symmetric water-drop-like form. This results in a large width of a bent area of the flexible display 4 in a process of changing from an unfolded state to a folded state. In addition, with the adoption of the symmetric design manner, the hinge mechanism has a large width and a complex structure. Therefore, the hinge mechanism occupies large space in the electronic device, which is not conducive to improving performance of the electronic device and is not conducive to simplifying the structure of the electronic device.

The hinge mechanism provided in this application is intended to resolve the foregoing problem, and to reduce a width of the hinge mechanism, simplify a structure of the hinge mechanism, reduce a weight of the hinge mechanism, reduce space occupied by the hinge mechanism in an entire electronic device, reserve more space for disposing other components, help improve performance of the electronic device, and help implement a miniaturization design of the electronic device. In addition, when the structure of the hinge mechanism is simplified, the two housings of the electronic device are designed as structures with unequal-thickness thicknesses, so that the structure of the electronic device can be further simplified, and a thickness of the electronic device in the folded state is small. In addition, the hinge mechanism can form asymmetric display accommodating space to meet a bending requirement of a flexible display. This helps reduce a width of a bent area of the flexible display, avoids deformation of the flexible display, reduces squeezing or pulling stress on the flexible display, prolongs a service life of the flexible display, improves reliability of the electronic device, and improves user experience. To facilitate understanding of the hinge mechanism provided in embodiments of this application, the following describes a specific structure of the hinge mechanism in detail with reference to the accompanying drawings.

It should be noted that terms used in the following embodiments are merely intended to describe specific embodiments, but are not intended to limit this application. Terms "one", "a", "the", "the foregoing", "this", and "the one" of singular forms used in this specification and the appended claims of this application are also intended to include forms like "one or more", unless otherwise specified in the context clearly.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Figure 4:
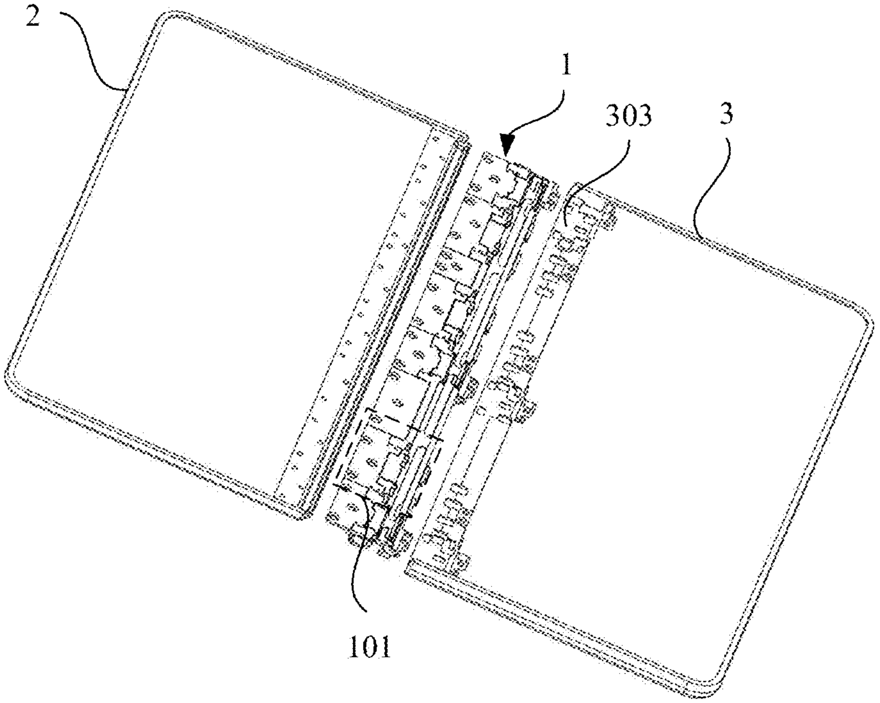
FIG. 4 is a diagram of an exploded structure of an electronic device according to an embodiment of this application.
Figure 5:
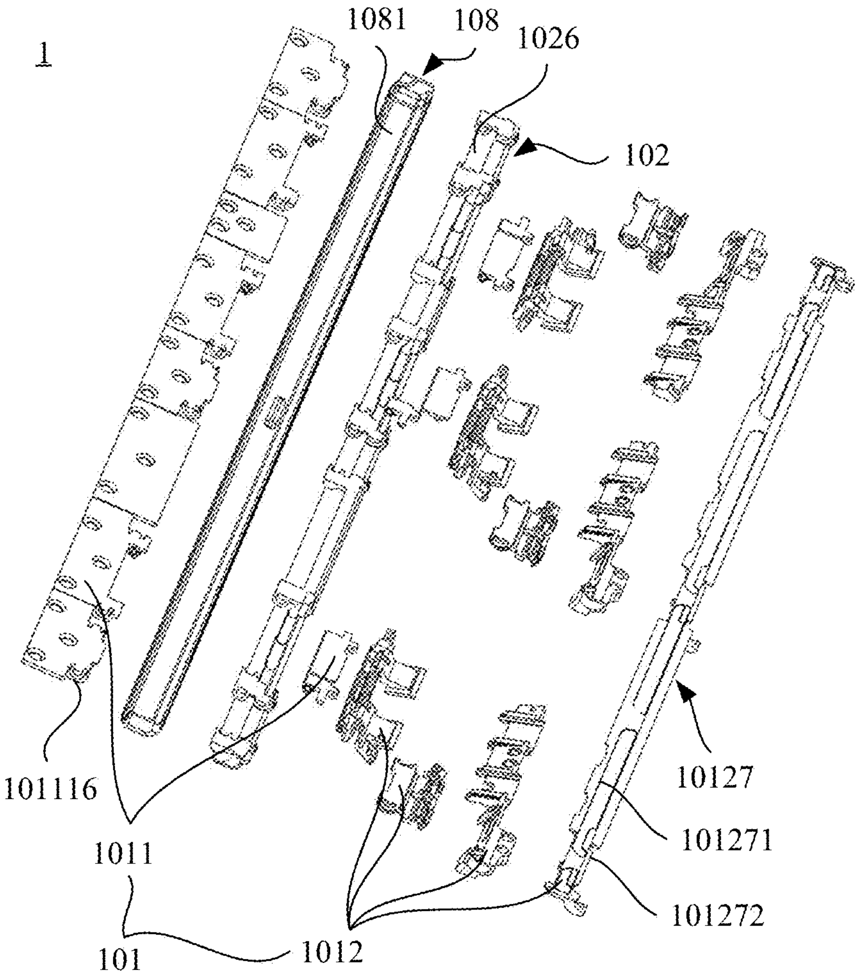
FIG. 5 is a diagram of an exploded structure of a hinge mechanism according to an embodiment of this application.

FIG. 4 is a diagram of an exploded structure of the electronic device shown in FIG. 2. The flexible display 4 (refer to FIG. 2) is omitted in FIG. 4. In addition, it can be seen from FIG. 4 that the first housing 2 and the second housing 3 are located on two opposite sides of the hinge mechanism 1. In this application, the hinge mechanism 1 may include one main shaft module 101, or may include a plurality of main shaft modules 101. For example, FIG. 5 is a diagram of an exploded structure of the hinge mechanism 1 shown in FIG. 4. In an embodiment shown in FIG. 5, the hinge mechanism 1 includes three main shaft modules 101, and the three main shaft modules 101 may be arranged in a spaced manner in a length direction of the hinge mechanism 1. In this application, the length direction of the hinge mechanism 1 is an extension direction of axes of the first housing 2 and the second housing 3 that rotate around the hinge mechanism 1. The first housing 2 and the second housing 3 may be rotatably connected via the plurality of main shaft modules 101. This can effectively improve rotation stability of the first housing 2 and the second housing 3 of the electronic device relative to the hinge mechanism 1.

In addition, still refer to FIG. 5. The hinge mechanism 1 may further include a base 102. The main shaft module 101 may include a first rotating assembly 1011 and a second rotating assembly 1012, and the base 102 may serve as a bearing component of the first rotating assembly 1011 and the second rotating assembly 1012. The first rotating assembly 1011 and the second rotating assembly 1012 are respectively disposed on two opposite sides of the base 102, and are rotatably connected to the base 102.

It should be noted that, in a possible embodiment of this application, when there is a plurality of main shaft modules 101, the first rotating assemblies 1011 and the second rotating assemblies 1012 of the plurality of main shaft modules 101 may all use the same base 102 as the bearing component. This improves an integration degree of the hinge mechanism 1. In some other possible embodiments of this application, the hinge mechanism 1 may be provided with one base 102 corresponding to each main shaft module 101, so that the first rotating assembly 1011 and the second rotating assembly 1012 of each main shaft module 101 use the corresponding base 102 as the bearing component.

Figure 8:
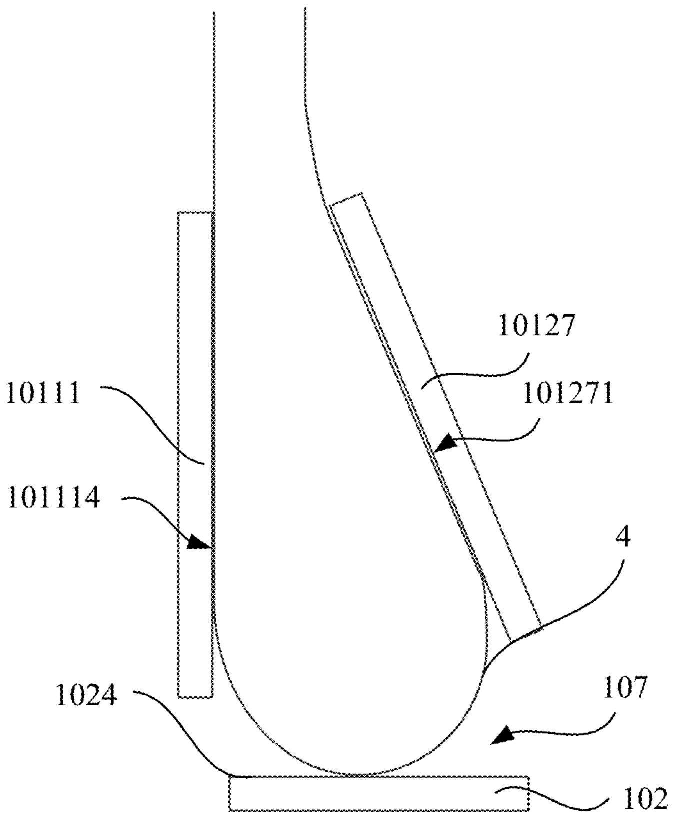
FIG. 8 is a block diagram of a structure of the hinge mechanism shown in FIG. 5 in a folded state.

The hinge mechanism 1 in FIG. 4 and FIG. 5 in the folded state can implement an eccentric water-drop-like form shown in FIG. 8. In addition, the hinge mechanism 1 further includes a synchronization mechanism for implementing synchronous motion of the first rotating assembly 1011 and the second rotating assembly 1012 and a damping mechanism for providing a damping hand feeling.

Such a mechanism design can greatly simplify a structure design on one side of the first rotating assembly 1011, allow a thinning design of the first housing 2, and implement unequal thickness of the first housing 2 and the second housing 3. Further, to implement thinning of the first housing 2, a partial structure of the first housing 2 may extend into the base 102 instead of being outside the base 102. Based on this, space used to accommodate the synchronization mechanism and the damping mechanism in the base 102 needs to be greatly compressed. However, the synchronization mechanism and the damping mechanism in this application are designed in a simplified manner, and can be accommodated in such small space, to provide accommodating space for the first housing 2. Certainly, it may be understood that the hinge mechanism 1 in this application is applicable to the foregoing scenario, and may be used as long as an electronic device is configured to implement folding and synchronous motion of housings on two sides and is configured to provide a damping force for the housings on the two sides.

The following describes the hinge mechanism 1 in detail.

Figure 6:
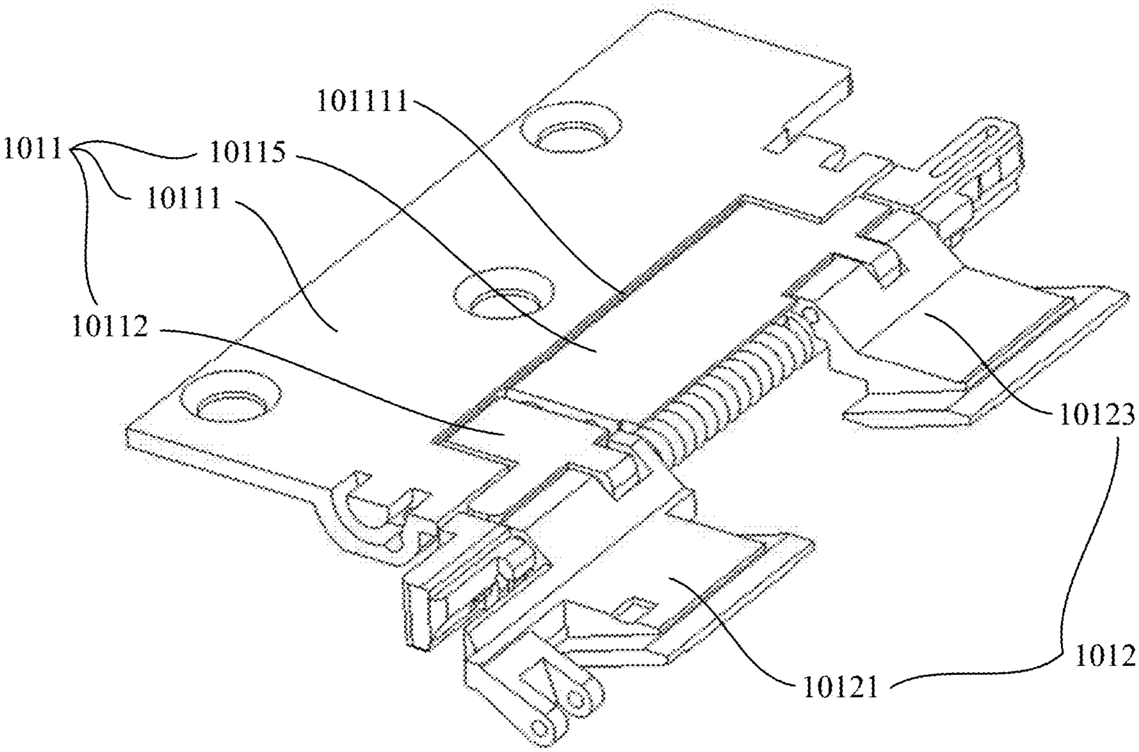
FIG. 6 is a diagram of a partial structure of a hinge mechanism according to an embodiment of this application.

FIG. 6 is a diagram of a partial structure of the hinge mechanism 1 according to an embodiment of this application. FIG. 6 shows a structure of the main shaft module 101. The first rotating assembly 1011 may include a first support plate 10111, and the first support plate 10111 may be rotatably connected to the base 102. In addition, the first support plate 10111 is provided with a notch 101111.

Figure 7A:
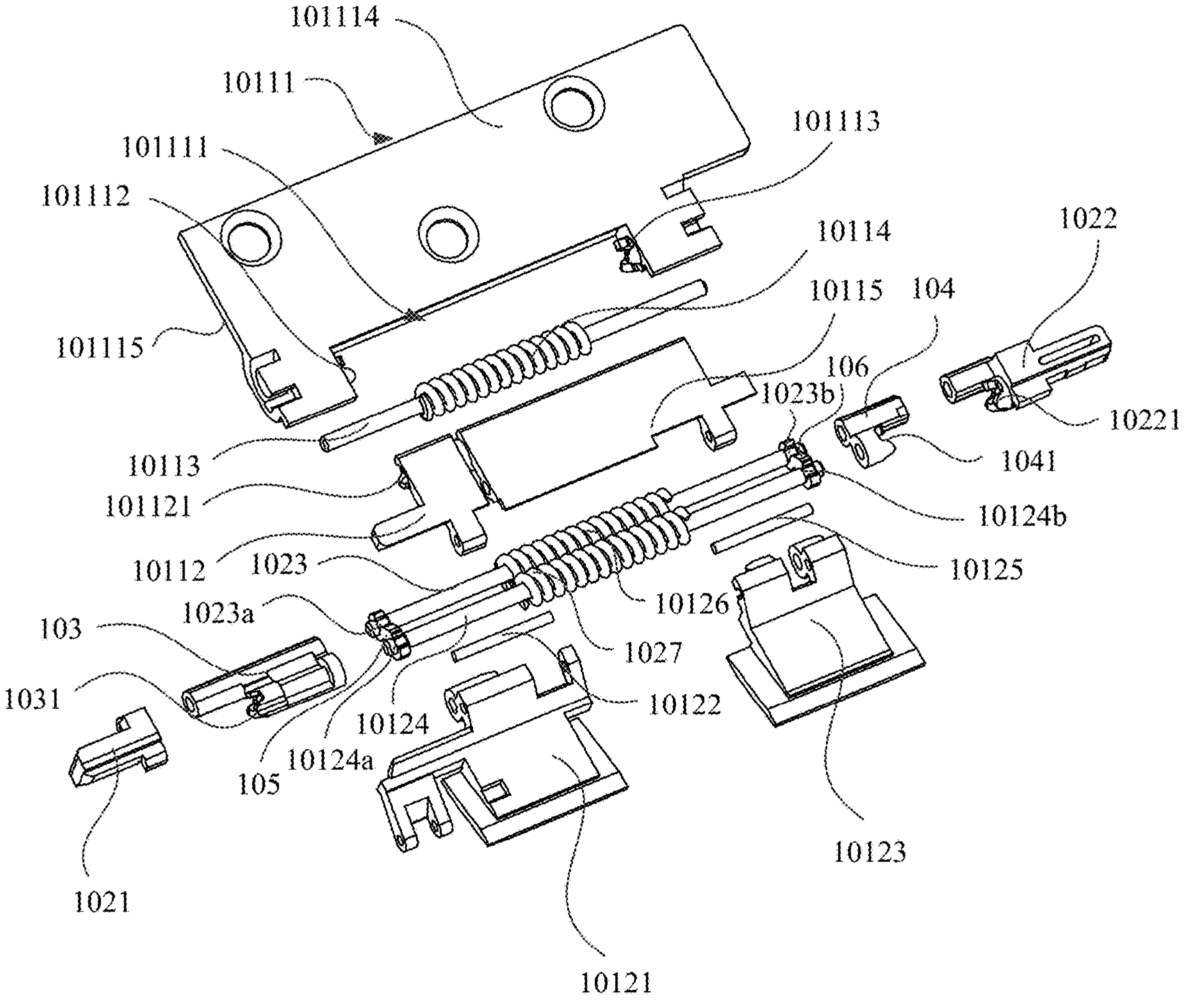
FIG. 7A is an exploded view of the structure shown in FIG. 6.

The first rotating assembly 1011 may further include a first rotating member 10112, and at least a part of the first rotating member 10112 is accommodated in the notch 101111 of the first support plate 10111. FIG. 7A is an exploded view of the structure shown in FIG. 6. The first support plate 10111 and the first rotating member 10112 may be rotatably connected through the first rotating shaft 10113.

Figure 7B:
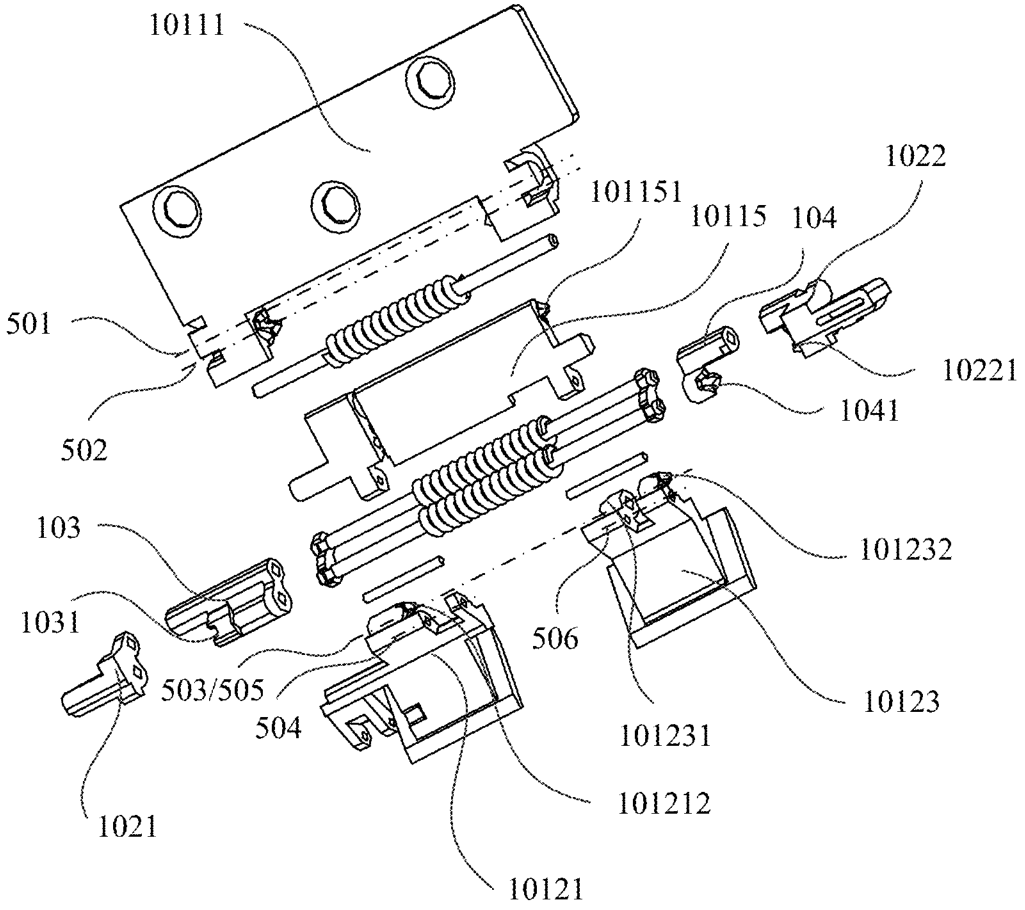
FIG. 7B is an exploded view of the structure shown in FIG. 6 from another angle.

In this application, a rotation center line on which the first support plate 10111 is rotatably connected to the base 102 may be referred to as a first axis 501 (in FIG. 7B, an example in which the first support plate 10111 is connected to the base 102 through a virtual shaft is used), and a rotation center line on which the first support plate 10111 is rotatably connected to the first rotating member 10112 is referred to as a second axis 502. The second axis 502 is also an axis of the first rotating shaft 10113. FIG. 7B is an exploded view of the structure shown in FIG. 6 from another angle. It can be seen from FIG. 7B that the first axis 501 and the second axis 502 are spaced apart.

Referring to FIG. 7A, the second rotating assembly 1012 may include a first support arm 10121, the first support arm 10121 may rotate around the base 102 shown in FIG. 5, and the first support arm 10121 is rotatably connected to the first rotating member 10112. A specific connection manner is not limited in this application. For example, the first support arm 10121 may be rotatably connected to the first rotating member 10112 through a first pin shaft 10122. However, it is a common connection manner in this field to rotatably connect two components through a pin shaft. Details are not described herein again. In this application, a rotation center line on which the first support arm 10121 rotates around the base 102 may be referred to as a third axis 503, and a rotation center line on which the first support arm 10121 is rotatably connected to the first rotating member 10112 is referred to as a fourth axis 504. The fourth axis 504 is also an axis of the first pin shaft 10122. It can be seen from FIG. 7B that the third axis 503 and the fourth axis 504 are spaced apart.

In this case, in the hinge mechanism 1 provided in this application, when the first support arm 10121 rotates around the base 102, the first rotating member 10112 may be driven to move. For example, in a process in which the first rotating assembly 1011 and the second rotating assembly 1012 are folded relative to each other, the first support arm 10121 rotates around the base 102, so that the first rotating member 10112 may move toward the first support plate 10111, the first support plate 10111 is pushed by the first rotating member 10112 to rotate around the base, and the first support plate 10111 and the first support arm 10121 rotate toward each other. However, in a process in which the first rotating assembly 1011 and the second rotating assembly 1012 are unfolded relative to each other, the first support arm 10121 rotates around the base 102, so that the first rotating member 10112 may move toward the first support arm 10121, the first support plate 10111 is pulled by the first rotating member 10112 to rotate around the base 102, and the first support plate 10111 and the first support arm 10121 rotate away from each other. Therefore, in a process of folding and unfolding the hinge mechanism 1, the first rotating assembly 1011 and the second rotating assembly 1012 can rotate reversely and synchronously, that is, a synchronous mechanism for implementing synchronous motion is provided.

In addition, referring to FIG. 7A, in an axial direction of the first rotating shaft 10113, a first cam surface 101112 may be further disposed on the first support plate 10111, and the first cam surface 101112 may be a wall surface of the notch 101111. The first rotating member 10112 is provided with a second cam surface 101121, and the second cam surface 101121 abuts against the first cam surface 101112.

It should be noted that, in this application, a cam surface may include a plurality of protrusion parts and recessed parts. When slopes of protrusion parts of two cam surfaces are in contact with each other, a damping force that prevents the two cam surfaces from continuing to rotate relative to each other may be generated between the two cam surfaces.

In this case, the first rotating member 10112 abuts against the first support plate 10111 through the first cam surface 101112 and the second cam surface 101121, so that when the hinge mechanism 1 is used in the electronic device, a user can have an obvious feeling in a process of unfolding or folding the electronic device. This helps improve user experience.

To improve tightness of fitting between the first cam surface 101112 and the second cam surface 101121, the first rotating assembly 1011 may further include a first elastic piece 10114, and the first elastic piece 10114 may be, for example, a spring. In addition, the first elastic piece 10114 may be sleeved on the first rotating shaft 10113, and the first rotating member 10112 is pressed on the first support plate 10111, so that the first cam surface 101112 abuts against the second cam surface 101121 under the elastic force of the first elastic piece 10114.

Referring to FIG. 7A, in this application, to improve motion stability of the hinge mechanism 1, the first rotating assembly 1011 may further include a second rotating member 10115. At least a part of the second rotating member 10115 may be accommodated in the notch 101111 of the first support plate 10111, and the second rotating member 10115 is rotatably connected to the first support plate 10111 through the first rotating shaft 10113, that is, in this case, the first support plate 10111, the first rotating member 10112, and the second rotating member 10115 are rotatably connected through the first rotating shaft 10113. In addition, the second rotating member 10115 and the first rotating member 10112 may alternatively be fastened through a pin shaft, to keep synchronization and stability of the two. Further, the second rotating member 10115 and the first rotating member 10112 may alternatively be of an integral structure.

In addition, in an axial direction of the first rotating shaft 10113, the first support plate 10111 may be further provided with a third cam surface 101113. The third cam surface 101113 may be another wall surface of the notch 101111. For example, the first cam surface 101112 and the third cam surface 101113 may be two wall surfaces that are disposed opposite to the notch 101111.

Figure 7C:
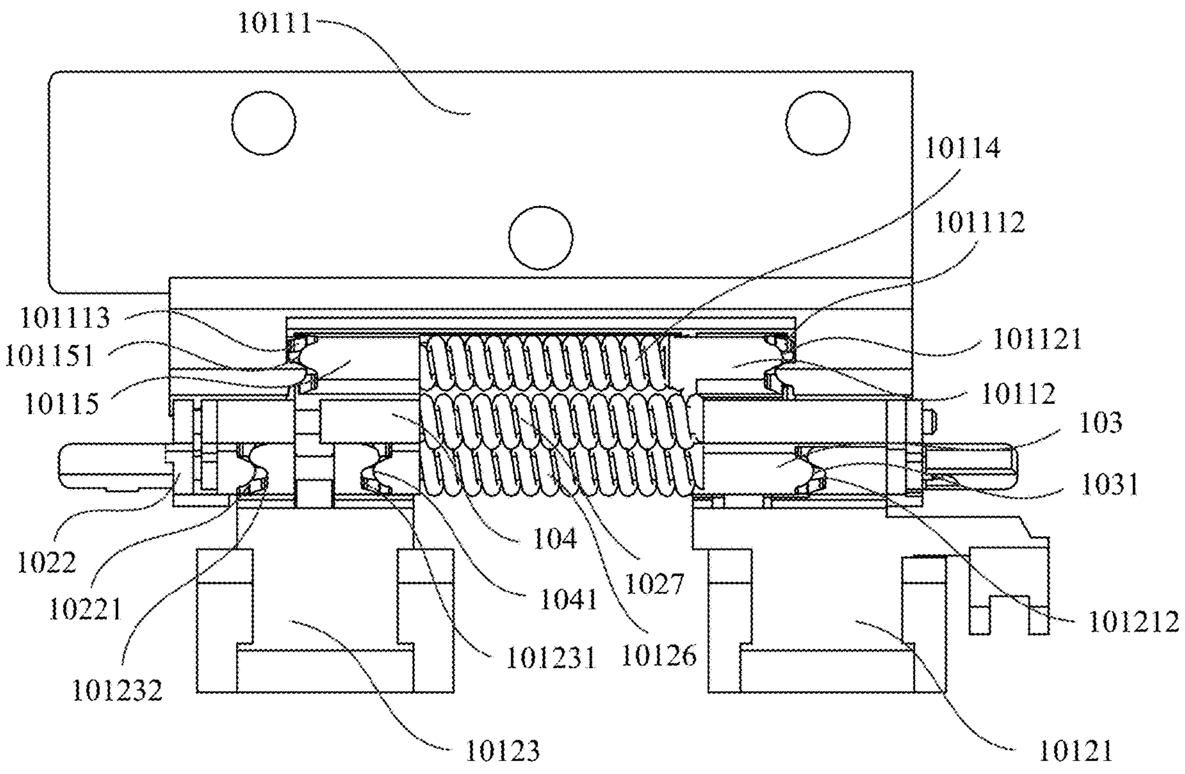
FIG. 7C is a diagram of a structure of the structure shown in FIG. 6 from another angle.

FIG. 7C is a diagram of a structure of the structure shown in FIG. 6 from another angle, and may be used to show a fitting relationship between cam surfaces. It can be learned from FIG. 7C that the second rotating member 10115 is provided with a fourth cam surface 101151, and the third cam surface 101113 abuts against the fourth cam surface 101151. The first elastic piece 10114 may also act on the second rotating member 10115, to press the second rotating member 10115 toward the first support plate 10111, so that the third cam surface 101113 tightly fits the fourth cam surface 101151.

Referring to FIG. 7A and FIG. 7C, the second rotating assembly 1012 may further include a second support arm 10123. The second support arm 10123 may be rotatably connected to the base 102, and a rotation center line on which the second support arm 10123 rotates around the base 102 may be referred to as a fifth axis 505. In this application, the first support arm 10121 and the second support arm 10123 may be rotatably connected through the second rotating shaft 10124, and the first support arm 10121 and the second support arm 10123 may be rotatably connected to the base 102 through the second rotating shaft 10124. It can be learned that the third axis 503 may coincide with the fifth axis 505.

In addition, the second support arm 10123 may be rotatably connected to the second rotating member 10115. A specific connection manner of the second support arm 10123 and the second rotating member 10115 is not limited in this application. For example, the second support arm 10123 may be rotatably connected to the second rotating member 10115 through the second pin shaft 10125. However, it is a common connection manner in this field to rotatably connect two components through a pin shaft. Details are not described herein again. In this application, a rotation center line on which the second support arm 10123 is rotatably connected to the second rotating member 10115 may be referred to as a sixth axis 506. It can be learned from FIG. 7B that the fifth axis 505 and the sixth axis 506 may be spaced apart.

In this way, in a process in which the first rotating assembly 1011 and the second rotating assembly 1012 are folded relative to each other, the second support arm 10123 rotates around the base 102, so that the second rotating member 10115 may move toward the first support plate 10111, the first support plate 10111 is pushed by the second rotating member 10115 to rotate around the base, and the first support plate 10111 and the second support arm 10123 rotate toward each other. However, in a process in which the first rotating assembly 1011 and the second rotating assembly 1012 are unfolded relative to each other, the second support arm 10123 rotates around the base 102, so that the second rotating member 10115 may move toward the second support arm 10123, the first support plate 10111 is pulled by the second rotating member 10115 to rotate around the base 102, and the first support plate 10111 and the first support arm 10121 rotate away from each other. Therefore, in a process of folding and unfolding the hinge mechanism 1, the first support arm 10121 and the second support arm 10123 may respectively drive the first rotating member 10112 and the second rotating member 10115 to rotate, to implement synchronous reverse rotation of the first rotating assembly 1011 and the second rotating assembly 1012. In addition, the first support plate 10111 rotates under the damping force generated by relative rotation of two pairs of cam surfaces that abut against each other, so that rotation stability of the first support plate 10111 can be effectively improved.

Referring to FIG. 7B and FIG. 7C, the hinge mechanism 1 may further include a first cam member 103, and the first cam member 103 is rotatably connected to the first support arm 10121 through the second rotating shaft 10124. In addition, in an axial direction of the second rotating shaft 10124, the first support arm 10121 may be provided with a fifth cam surface 101212, and the fifth cam surface 101212 may be disposed facing the second support arm 10123. The first cam member 103 may be provided with a sixth cam surface 1031, and the fifth cam surface 101212 abuts against the sixth cam surface 1031. Based on this, it may be understood that the sixth cam surface 1031 is located on a side that is of the first cam member 103 and that is away from the second support arm 10123.

To improve tightness of fitting between the fifth cam surface 101212 and the sixth cam surface 1031, the second rotating assembly 1012 may further include a second elastic piece 10126, and the second elastic piece 10126 may be, for example, a spring. In addition, the second elastic piece 10126 may be sleeved on the second rotating shaft 10124, and the first cam member 103 is pressed on the first support arm 10121, so that the fifth cam surface 101212 abuts against the sixth cam surface 1031 under the elastic force of the second elastic piece 10126.

In addition, the hinge mechanism 1 may further include a second cam member 104, and the second cam member 104 is rotatably connected to the second support arm 10123 through the second rotating shaft 10124. The second support arm 10123 may be provided with a seventh cam surface 101231, and the seventh cam surface 101231 may be disposed facing the first support arm 10121. The second cam member 104 is provided with an eighth cam surface 1041, the eighth cam surface 1041 is disposed away from the first support arm 10121, and the seventh cam surface 101231 abuts against the eighth cam surface 1041. The second elastic piece 10126 may also act on the second cam member 104, to press the second cam member 104 toward the second support arm 10123, so that the seventh cam surface 101231 tightly fits the eighth cam surface 1041.

Referring to FIG. 7A, the first cam member 103 and the second cam member 104 may be connected through a third rotating shaft 1023. In addition, both the first cam member

103 and the second cam member 104 are connected to the second rotating shaft 10124. Therefore, degrees of freedom of rotation of the first cam member 103 and the second cam member 104 around the base 102 are limited through the second rotating shaft 10124 and the third rotating shaft 1023, and the first cam member 103 and the second cam member 104 do not rotate relative to the base 102. Therefore, it may be understood that, in a process in which the first support arm 10121 rotates around the base 102, the fifth cam surface 101212 may rotate relative to the sixth cam surface 1031, to generate a damping force. In addition, in a process in which the second support arm 10123 rotates around the base 102, the seventh cam surface 101231 may rotate relative to the eighth cam surface 1041, to generate a damping force.

In addition, the base 102 may include a first damping support 1021 and a second damping support 1022. The first cam member 103 abuts against the first damping support 1021, and the second cam member 104 abuts against the second damping support 1022. To implement abutting between the first cam member 103 and the first damping support 1021 and abutting between the second cam member 104 and the second damping support 1022, the base 102 may further include a third elastic piece 1027, and the third elastic piece 1027 may be sleeved on the third rotating shaft 1023. Therefore, under the elastic force of the third elastic piece 1027, the first cam member 103 abuts against the first damping support 1021, and the second cam member 104 abuts against the second damping support 1022. In addition, a first end **10124*a* of the second rotating shaft 10124 and a first end 1023*a* of the third rotating shaft 1023 may be clamped to the first damping support 1021, and a second end 10124*b* of the second rotating shaft 10124 and a second end 1023*b* of the third rotating shaft 1023 may be clamped to the second damping support 1022, to limit axial directions of the second rotating shaft 10124 and the third rotating shaft 1023**.

In this application, the hinge mechanism 1 may further include a first limiting sheet 105, and the first end **10124*a* of the second rotating shaft 10124 and the first end 1023*a* of the third rotating shaft 1023 may be separately clamped to the first limiting sheet 105, to prevent components, such as the first cam member 103 and the first support arm 10121, disposed on the second rotating shaft 10124 and the third rotating shaft 1023 from falling off from corresponding rotating shafts, and improve reliability of the hinge mechanism 1. Similarly, the hinge mechanism 1 may further include a second limiting sheet 106, and the second end 10124*b* of the second rotating shaft 10124 and the second end 1023*b* of the third rotating shaft 1023 may be separately clamped to the second limiting sheet 106, to prevent components, such as the second cam member 104 and the second support arm 10123, disposed on the second rotating shaft 10124 and the third rotating shaft 1023 from falling off from corresponding rotating shafts, and improve reliability of the hinge mechanism 1**.

In addition, in an axial direction of the second rotating shaft 10124, the second damping support 1022 is provided with a ninth cam surface 10221, and the ninth cam surface 10221 is disposed facing the second support arm 10123. The second support arm 10123 is further provided with a tenth cam surface 101232, and the tenth cam surface 101232 is disposed away from the first support arm 10121, that is, the tenth cam surface 101232 and the seventh cam surface 101231 may be two surfaces that are of the second support arm 10123 and that are disposed away from each other. The ninth cam surface 10221 abuts against the tenth cam surface 101232. In addition, when the second elastic piece 10126 is further sleeved on the second rotating shaft 10124, the ninth cam surface 10221 and the tenth cam surface 101232 may be in tighter fitting under the elastic force of the second elastic piece 10126.

It can be learned from the foregoing that, five pairs of cam surfaces that abut against each other are disposed between the first rotating assembly 1011 and the second rotating assembly 1012, so that stability of synchronous rotation of the first rotating assembly 1011 and the second rotating assembly 1012 can be effectively improved, and a large damping force can be generated between the two rotating assemblies. In this way, when the hinge mechanism 1 is used in the electronic device, the user may have an obvious feeling in a process of unfolding or folding the electronic device. This helps improve user experience, that is, a damping mechanism that provides a damping hand feeling is provided.

It may be understood that, based on the foregoing description of the manner of disposing the cam surfaces that are disposed between the first rotating assembly 1011 and the second rotating assembly 1012 and that abut against each other, other surfaces that are disposed between the first rotating assembly 1011 and the second rotating assembly 1012 and that abut against each other may be further disposed as cam surfaces based on a specific application scenario, to increase a damping force generated between the first rotating assembly 1011 and the second rotating assembly 1012. It should be understood that the foregoing falls within the protection scope of this application. Details are not described herein again.

Referring to FIG. 6 and FIG. 7A, in this application, the first support plate 10111 may include a first plate surface 101114 and a second plate surface 101115 that are disposed opposite to each other. In addition, refer to FIG. 5. The second rotating assembly 1012 may further include a second support plate 10127, and the second support plate 10127 includes a third plate surface 101271 and a fourth plate surface 101272 that are disposed opposite to each other. The first plate surface 101114 and the third plate surface 101271 may be configured to support the flexible display 4.

FIG. 8 is a block diagram of a structure of the hinge mechanism 1 shown in FIG. 5 in a folded state. It can be learned from FIG. 8 that, in the hinge mechanism 1 provided in this application, the base 102 may include a bearing surface 1024 configured to support a flexible display 4. In addition, an included angle between the first plate surface 101114 of the first support plate 10111 and the bearing surface 1024 may be greater than an included angle between the third plate surface 101271 of the second support plate 10127 and the bearing surface 1024, to form, among the first plate surface 101114, the second plate surface 101115, and the bearing surface 1024, triangular display accommodating space 107 that tilts toward a side of the second support plate 10127. A bendable part of the flexible display 4 of the electronic device may be accommodated in the display accommodating space 107, to form an eccentric water-drop-like form. This can enable a width of the bending area of the flexible display 4 to be small.

Figure 9:
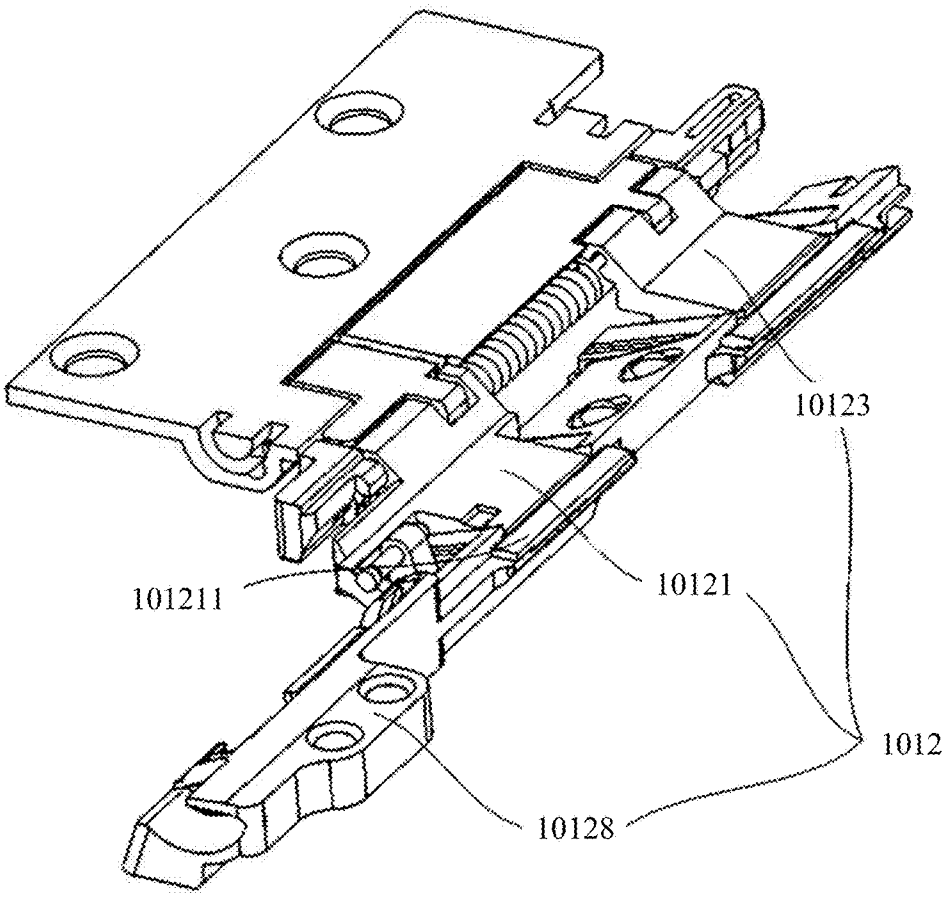
FIG. 9 is a diagram of a partial structure of a hinge mechanism according to another embodiment of this application.

To enable the hinge mechanism 1 to form the display accommodating space 107, a structure of the second rotating assembly 1012 may be designed in a related manner. FIG. 9 is a diagram of a partial structure of the hinge mechanism 1 according to an embodiment of this application. The second rotating assembly 1012 may further include a housing mounting bracket 10128. The housing mounting bracket 10128 and the first support arm 10121 are located on a same side of the base 102, and the housing mounting bracket 10128 is connected to the first support arm 10121. In addition, when the hinge mechanism 1 provided in this application is used in an electronic device, the housing mounting bracket 10128 may be fastened to one housing of the electronic device.

Figure 10:
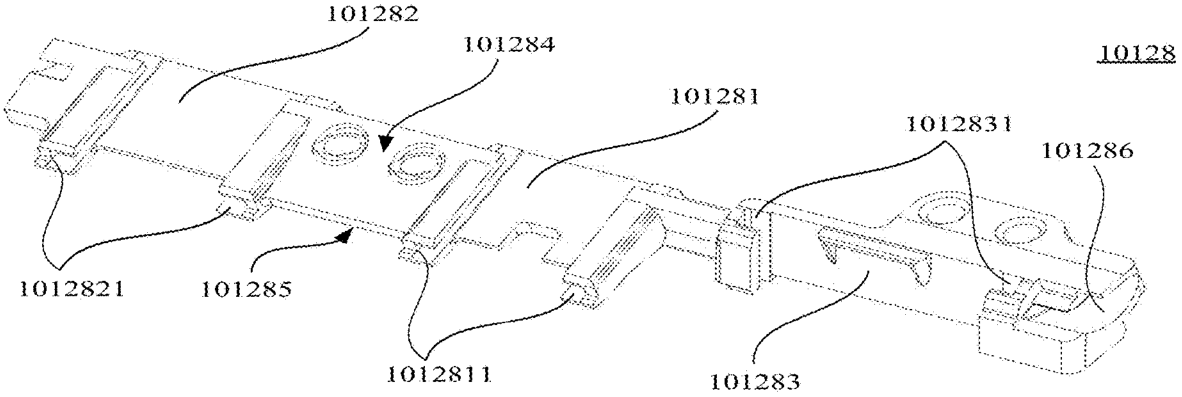
FIG. 10 is a diagram of a structure of a housing mounting bracket according to an embodiment of this application.

When the housing mounting bracket 10128 is specifically disposed, refer to FIG. 10. FIG. 10 is a diagram of a structure of the housing mounting bracket 10128 according to a possible embodiment of this application. In this embodiment, the housing mounting bracket 10128 may be provided with a first sliding groove 101281, and the first sliding groove 101281 extends in a first direction. Referring to FIG. 9 and FIG. 10, the first support arm 10121 may be mounted in the first sliding groove 101281, and may slide in the first direction in the first sliding groove 101281. The first direction may be a direction in which the housing mounting bracket 10128 moves toward or away from the base 102. In addition, to prevent the first support arm 10121 from falling off from the first sliding groove 101281, a first sliding rail 1012811 may be disposed on a groove wall of the first sliding groove 101281, and a first sliding block 101211 may be disposed on the first support arm 10121. In this way, the first sliding block 101211 may be clamped on the first sliding rail 1012811, and the first sliding block 101211 may slide along the first sliding rail 1012811, to limit the first support arm 10121 in the first sliding groove 101281. In addition, the first sliding rail 1012811 is disposed on the groove wall of the first sliding groove 101281 to provide guide for sliding of the first support arm 10121 along the first sliding groove 101281, so that motion stability of the first support arm 10121 is improved.

In addition, when the second rotating assembly 1012 further includes the second support arm 10123, the housing mounting bracket 10128 may be further provided with a second sliding groove 101282. Refer to FIG. 10. The second sliding groove 101282 may extend in the first direction, and the first sliding groove 101281 and the second sliding groove 101282 are spaced apart. In addition, to prevent the second support arm 10123 from falling off from the second sliding groove 101282, a second sliding rail 1012821 may be disposed on a groove wall of the second sliding groove 101282, and a second sliding block may be disposed on the second support arm 10123. In this way, the second sliding block may be clamped on the second sliding rail 1012821, and the second sliding block may slide along the second sliding rail 1012821, to limit the second support arm 10123 in the second sliding groove 101282. In addition, the second sliding rail 1012821 is disposed on the groove wall of the second sliding groove 101282 to provide guide for sliding of the second support arm 10123 along the second sliding groove 101282, so that motion stability of the second support arm 10123 is improved.

Figure 11:
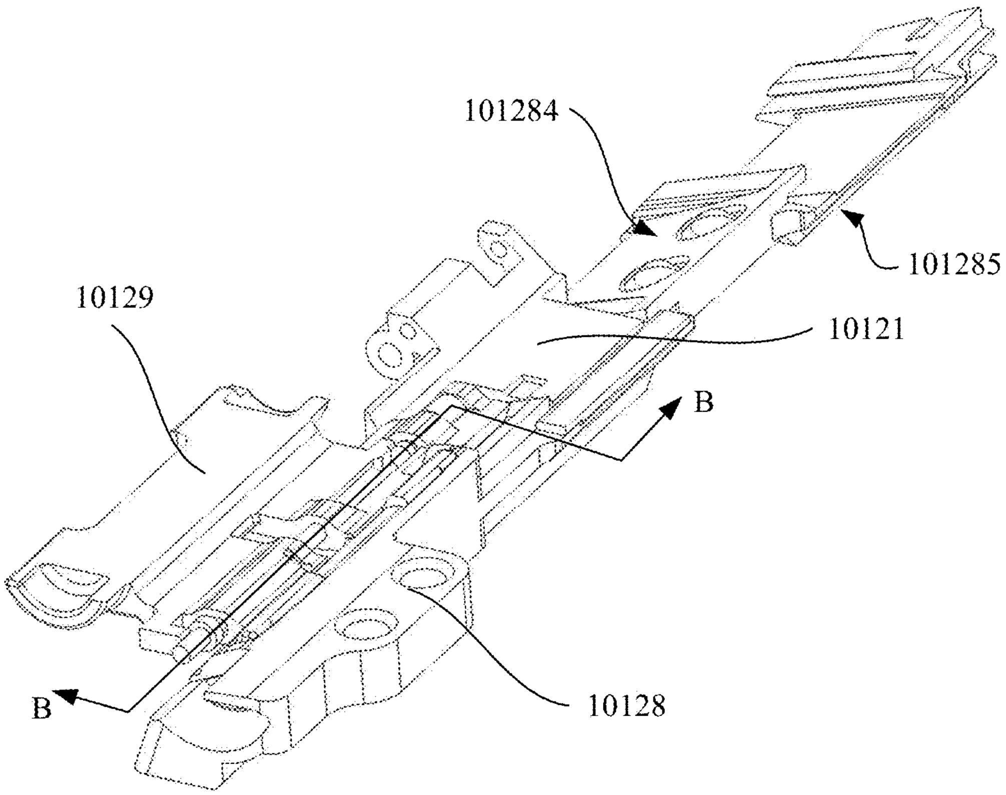
FIG. 11 is a diagram of a connection relationship between a swing arm and a housing mounting bracket according to an embodiment of this application.

In this application, the second rotating assembly 1012 may further include a swing arm (not shown in FIG. 9). The swing arm and the first support arm 10121 are located on a same side of the base 102, and the swing arm is slidably connected to the housing mounting bracket 10128. Still refer to FIG. 10. The housing mounting bracket 10128 may be further provided with a third sliding groove 101283. The third sliding groove 101283 may extend in a second direction, and in a length direction of the housing mounting bracket 10128, the first sliding groove 101281 and the third sliding groove 101283 are spaced apart. FIG. 11 shows a connection relationship between a swing arm 10129 and the housing mounting bracket 10128. An end that is of the swing arm 10129 and that faces the housing mounting bracket 10128 may be mounted in the third sliding groove 101283, and the swing arm 10129 may slide in the third sliding groove 101283 in the second direction. In this application, the housing mounting bracket 10128 may include a first surface 101284 and a second surface 101285 that are disposed opposite to each other. The first surface 101284 may be a side surface that is of the housing mounting bracket 10128 and that faces the flexible display 4 when the hinge mechanism 1 is used in the electronic device. In this case, the second direction may be a direction from the first surface 101284 to the second surface 101285, or a direction from the second surface 101285 to the first surface 101284. In addition, a projection along the second direction in a first cross section may not be parallel to a projection along the first direction in the first cross section. The first cross section may be a reference plane perpendicular to the rotation axis of the first support arm 10121 and the rotation axis of the swing arm 10129.

Figure 12:
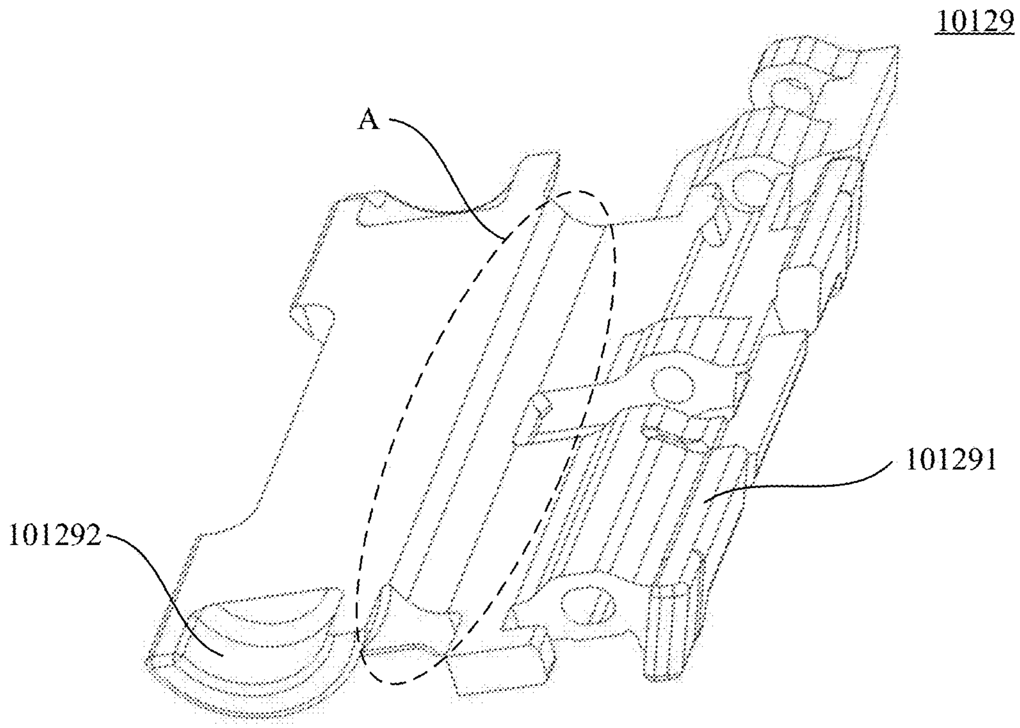
FIG. 12 is a diagram of a structure of a swing arm according to an embodiment of this application.

Referring to FIG. 10, in this application, a third sliding rail 1012831 may also be disposed in the third sliding groove 101283. In addition, FIG. 12 is a diagram of a structure of the swing arm 10129 according to this application. A third sliding block 101291 is disposed on the swing arm 10129. In this way, the third sliding block 101291 may be clamped on the third sliding rail 1012831, and the third sliding block 101291 may slide along the second direction in the third sliding rail 1012831, to limit the swing arm 10129 in the third sliding groove 101283. This may prevent the swing arm 10129 from falling off from the third sliding groove 101283. In addition, the third sliding rail 1012831 is disposed on the groove wall of the third sliding groove 101283 to provide guide for sliding of the swing arm 10129 along the third sliding groove 101283, so that motion stability of the swing arm 10129 is improved.

In this application, the swing arm 10129 may be rotatably connected to the base 102. In a possible embodiment of this application, the swing arm 10129 may be rotatably connected to the base 102 through a virtual shaft. The virtual shaft refers to an axis center of a circular arc-shaped structure. Two components that are rotatably connected are rotatable relative to the virtual shaft, and a location of the virtual shaft is fixed as the two components that are rotatably connected rotate relative to each other.

The swing arm 10129 may be rotatably connected to the base 102 through the virtual shaft. This can help reduce space occupied by the swing arm 10129 on the base 102, help reduce a volume of the main shaft module 101, and implement a miniaturization design of the hinge mechanism 1. During specific implementation, still refer to FIG. 12. A second arc-shaped rotating block 101292 may be disposed at an end that is of the swing arm 10129 and that is connected to the base 102.

Figure 13:
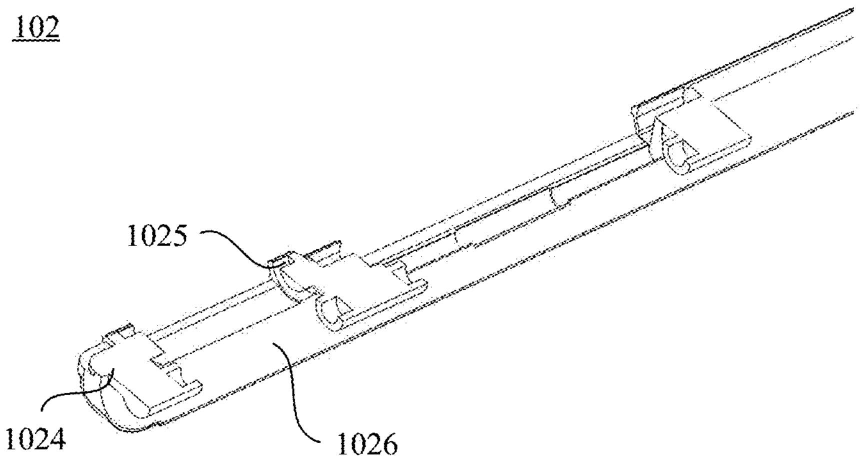
FIG. 13 is a diagram of a partial structure of a base according to an embodiment of this application.

In addition, FIG. 13 is a diagram of a partial structure of the base 102. The base 102 may be provided with a second arc-shaped groove 1025. A second arc-shaped rotating block 101292 of the swing arm 10129 shown in FIG. 12 may be accommodated in the second arc-shaped groove 1025, and may slide along an arc-shaped surface of the second arc-shaped groove 1025, to implement rotation of the swing arm 10129 around the base 102. The swing arm 10129 may be rotatably connected to the base 102 through the virtual shaft. This can help reduce space occupied by the swing arm 10129 on the base 102, help reduce a volume of the main shaft module 101, and implement a miniaturization design of the hinge mechanism 1. It should be noted that, in this application, the second arc-shaped rotating block 101292 may be but is not limited to a circular arc-shaped rotating block, and the second arc-shaped groove 1025 may be but is not limited to a circular arc-shaped groove.

In the embodiment shown in FIG. 13, the second arc-shaped groove 1025 is an integrated channel structure directly disposed on the base 102. This can implement an integrated design of the base 102, and improve structural reliability of the hinge mechanism 1. In addition, a quantity of second arc-shaped grooves 1025 may be but is not limited to at least two. The at least two second arc-shaped grooves 1025 may be spaced apart in a length direction of the base 102, and the at least two second arc-shaped grooves 1025 may limit the second arc-shaped rotating block 101292, to improve reliability of a connection between the second arc-shaped rotating block 101292 and the base 102.

In some other possible embodiments, the second arc-shaped groove 1025 may alternatively include two structures that abut against each other. For example, the main shaft module 101 may include a cover plate, and the cover plate may cover the base 102, to form accommodating space between the cover plate and the base 102. In addition, an arc-shaped protrusion may be disposed on a part that is of the cover plate and that covers the second arc-shaped groove 1025, and the second arc-shaped rotating block 101292 of the swing arm 10129 shown in FIG. 12 may be inserted between the arc-shaped protrusion and the second arc-shaped groove 1025. In this way, the arc-shaped protrusion limits the second arc-shaped rotating block 101292 of the swing arm 10129 to be located in the second arc-shaped groove 1025 of the base 102, to reduce a risk that the swing arm 10129 falls off from the base 102, and improve motion reliability of the swing arm 10129.

The swing arm 10129 and the base 102 may be rotatably connected through a virtual shaft. In other embodiments of this application, the two may alternatively be rotatably connected through a physical shaft. For example, the swing arm 10129 may be rotatably connected to the base 102 through one pin shaft. In this way, when the hinge mechanism 1 includes a plurality of main shaft modules 101, the swing arm 10129 of at least one main shaft module 101 of the plurality of main shaft modules 101 may be rotatably connected to the base 102 through a virtual shaft, and the swing arm 10129 of at least one main shaft module 101 may be rotatably connected to the base 102 through a physical shaft. In this case, the swing arm 10129 of the main shaft assembly that is disposed opposite to the flexible display 4 of the electronic device may be rotatably connected to the base 102 through a virtual shaft, and the swing arm 10129 of the main shaft assembly that is located at the two end parts in the length direction of the hinge mechanism 1 may be rotatably connected to the base 102 through a physical shaft.

Figure 14A:
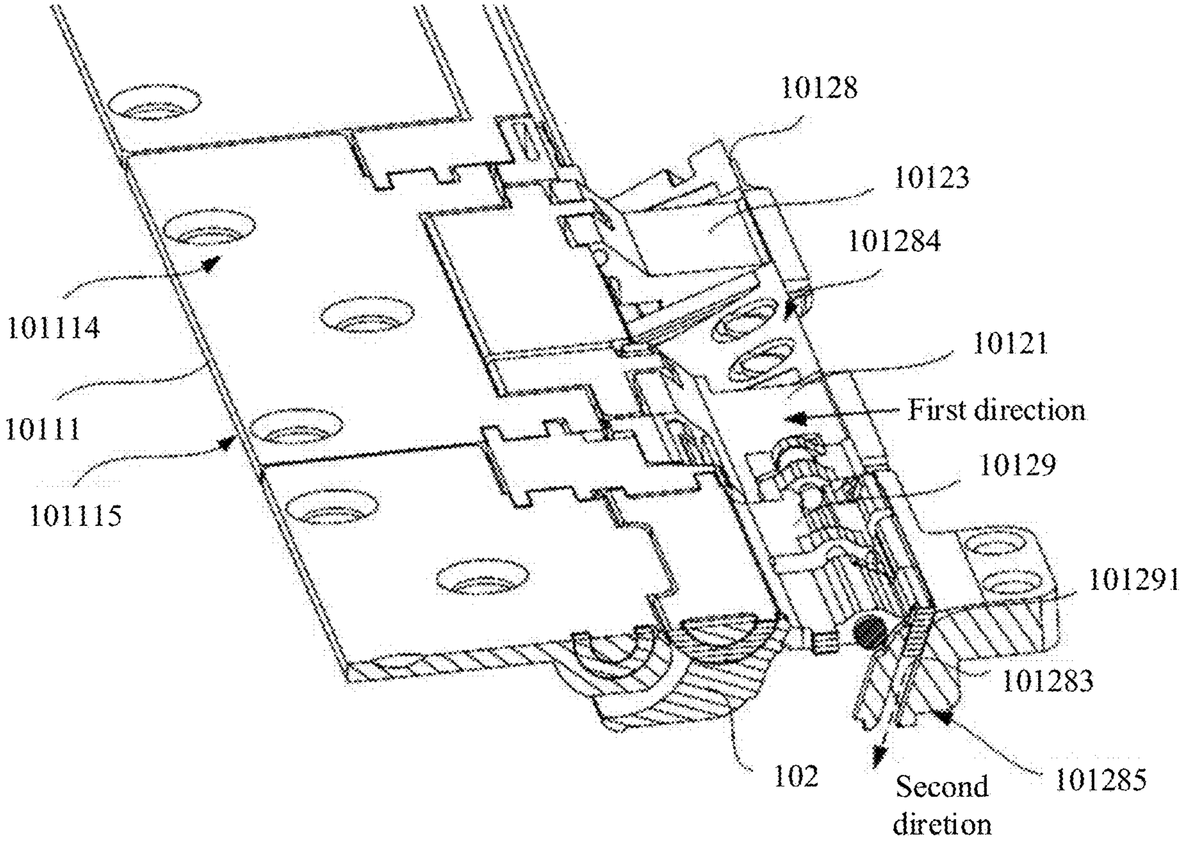
FIG. 14A is a diagram of a structure of a hinge mechanism in an unfolded state according to an embodiment of this application.

After a connection relationship between the first support arm 10121 and the swing arm 10129, the base 102, and the housing mounting bracket 10128 provided in the foregoing embodiments of this application is understood, the following describes motions of the first support arm 10121 and the swing arm 10129 relative to the housing mounting bracket 10128. FIG. 14A shows relative positions of the housing mounting bracket 10128 and the base 102 when the hinge mechanism 1 is in an unfolded state. In this case, an edge that is of the housing mounting bracket 10128 and that faces the base 102 is closest to the base 102, and the third sliding block 101291 of the swing arm 10129 is closest to the first surface 101284 of the housing mounting bracket 10128.

Figure 14B:
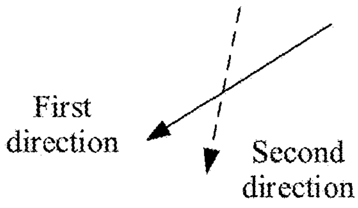
FIG. 14B is a diagram of a first section according to an embodiment of this application.

It can be learned from the description of the foregoing embodiments that, when the hinge mechanism 1 rotates from the unfolded state to a folded state, the first support arm 10121 may slide in the first sliding groove 101281 in the first direction, and the swing arm 10129 may slide in the third sliding groove 101283 in the second direction. In FIG. 14A, a solid line with an arrow represents the first direction, and a dashed line with an arrow represents the second direction. In addition, FIG. 14B is a diagram of a first cross section according to a possible embodiment. In the first cross section, a first direction and a second direction intersect, and an angle at which the first direction and the second direction intersect may be an acute angle in the figure, or may be another possible angle, for example, a right angle or an obtuse angle.

Figure 14C:
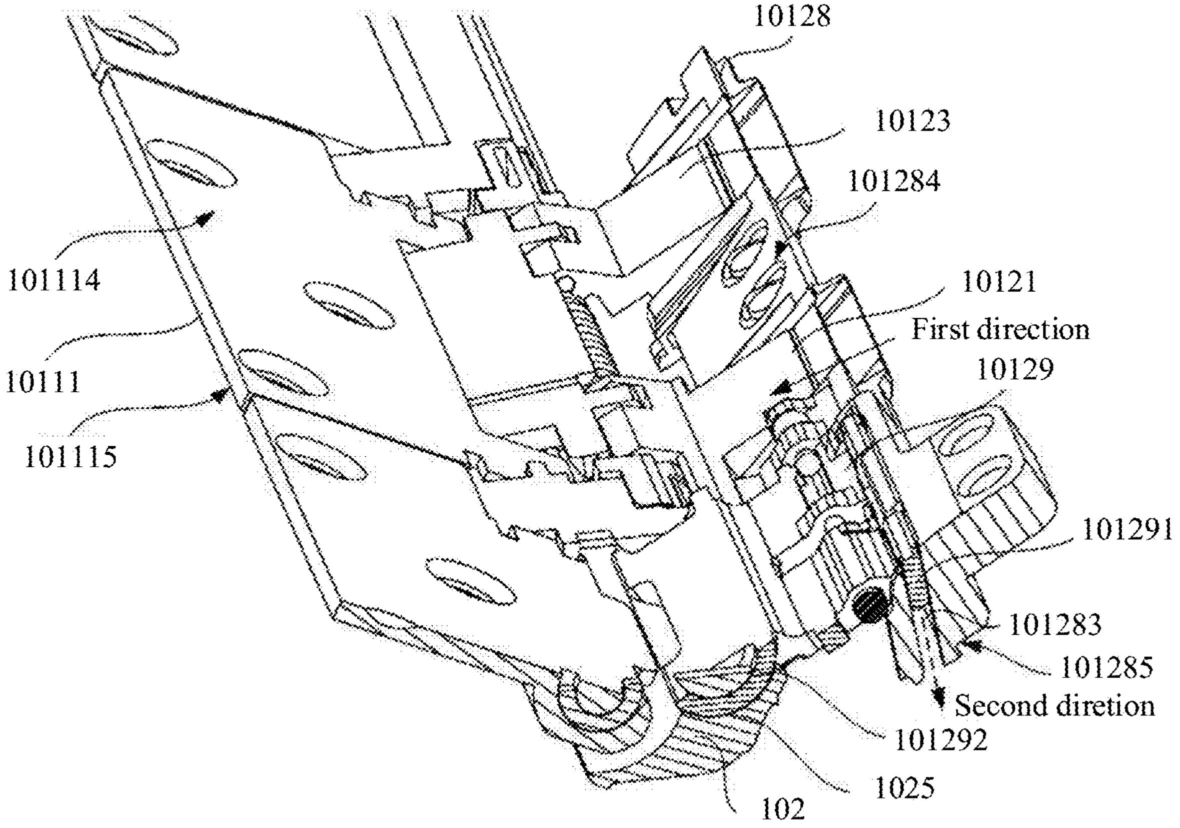
FIG. 14C is a diagram of a structure of a hinge mechanism in an intermediate state according to an embodiment of this application.

FIG. 14C shows relative positions of the housing mounting bracket 10128 and the base 102 when the hinge mechanism 1 is in an intermediate state. It can be learned by comparing FIG. 14C and FIG. 14A that, in this process, the housing mounting bracket 10128 may move in a direction away from the base 102 relative to the first support arm 10121, and drive the first support arm 10121 and the swing arm 10129 to rotate around the base 102. The second arc-shaped rotating block 101292 of the swing arm 10129 moves in a direction of sliding out of the second arc-shaped groove 1025, so that a part that is of the second arc-shaped rotating block 101292 and that is accommodated in the second arc-shaped groove 1025 is reduced. In addition, the third sliding block 101291 of the swing arm 10129 slides in the third sliding rail 1012831 from the first surface 101284 of the housing mounting bracket 10128 to the second surface 101285.

Figure 14D:
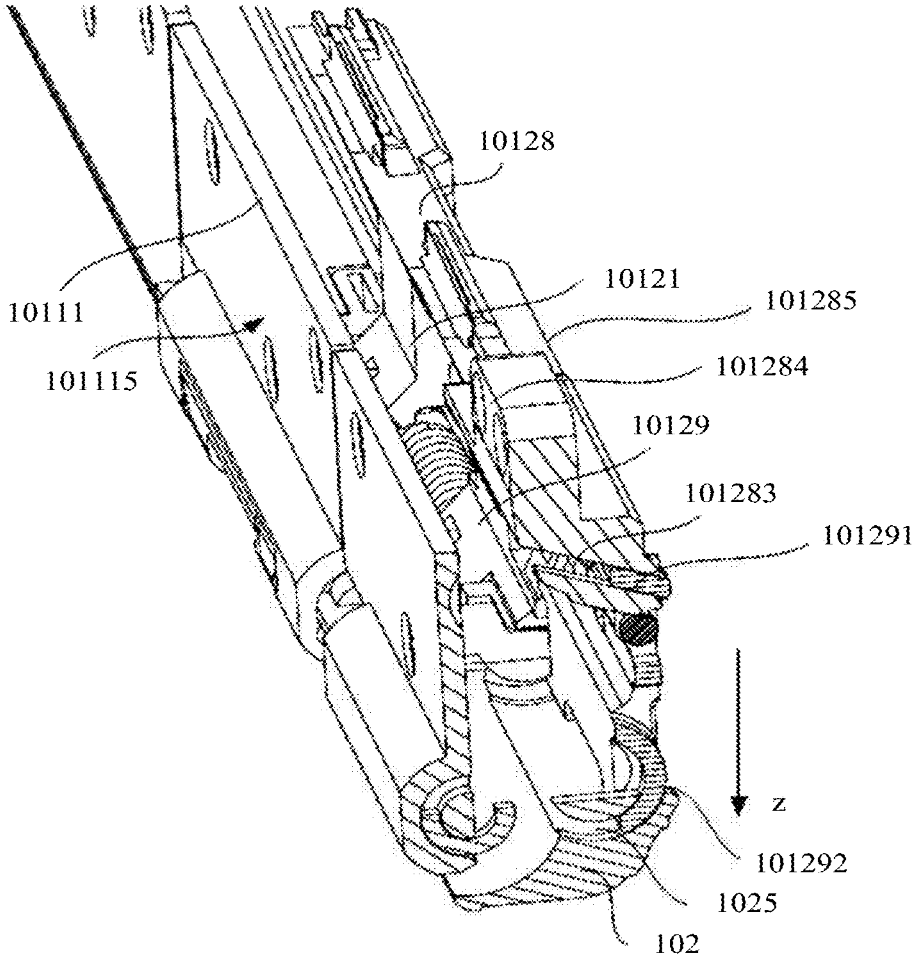
FIG. 14D is a diagram of a structure of a hinge mechanism in a folded state according to an embodiment of this application.

In addition, FIG. 14D shows relative positions of the housing mounting bracket 10128 and the base 102 when the electronic device is in the folded state. In a rotation process from FIG. 14C to FIG. 14D, the housing mounting bracket 10128 continues to move in a direction away from the base 102 relative to the first support arm 10121, and drives the first support arm 10121 to rotate around the base 102. The second arc-shaped rotating block 101292 of the swing arm 10129 continues to move in a direction of sliding out of the second arc-shaped groove 1025, so that a part that is of the second arc-shaped rotating block 101292 and that is accommodated in the second arc-shaped groove 1025 is further reduced. In addition, the third sliding block 101291 of the swing arm 10129 continues to slide in the third sliding groove 101283 in a direction toward the second surface 101285 of the housing mounting bracket 10128.

It may be understood that when the electronic device rotates from the folded state shown in FIG. 14D to the unfolded state shown in FIG. 14A, the housing mounting bracket 10128, the first support arm 10121, and the swing arm 10129 may separately move in a direction opposite to that in the foregoing rotation process from FIG. 14A to FIG. 14D. Details are not described herein again.

Figure 15:
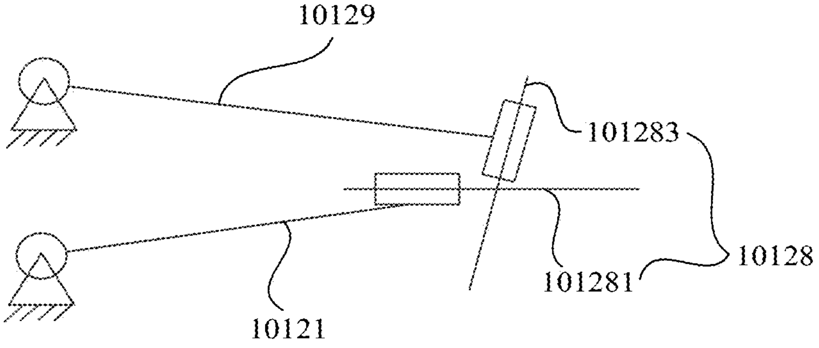
FIG. 15 is a diagram of a principle of a mechanism in which a first support arm and a swing arm slide relative to a housing mounting bracket according to an embodiment of this application.

FIG. 15 is a diagram of a principle of a mechanism in which the first support arm 10121 and the swing arm 10129 slide relative to the housing mounting bracket 10128 according to an embodiment of this application. It can be learned from FIG. 15 that, by using the hinge mechanism 1 provided in this application, when the first support arm 10121 and the swing arm 10129 rotate around the base 102, rotation axis centers of the first support arm 10121 and the swing arm 10129 do not coincide. This can implement a phase difference motion between the axis center of the first support arm 10121 and the axis center of the swing arm 10129. In addition, providing directions of the first sliding groove 101281 and the third sliding groove 101283 are appropriately designed, so that rotation angles of both the first support arm 10121 and the swing arm 10129 relative to the base 102 can be less than or equal to 90°. Compared with another solution, this solution can effectively reduce the rotation angle of the swing arm 10129, enable a wall thickness design of a partial structure (for example, a structure at a position A of the swing arm 10129 shown in FIG. 12) of the swing arm 10129 to meet a strength requirement, and improve structural reliability of the swing arm 10129. In addition, this solution can further effectively avoid a case in which a component in the electronic device is thinned, to avoid rotation of the swing arm 10129. This can improve reliability of an overall structure of the electronic device.

In addition, referring to FIG. 14D, when the hinge mechanism 1 is in the folded state, both the first support arm 10121 and the swing arm 10129 have a support force for the housing mounting bracket 10128 in a Z direction shown in FIG. 14D. This can effectively improve a motion combination degree between the first support arm 10121 and the swing arm 10129 and the first housing mounting bracket 10128, and stop the housing mounting bracket 10128 in the direction. In this way, even if the electronic device in which the hinge mechanism 1 is used falls off in the folded state, the hinge mechanism can effectively reduce a risk of generating a large instantaneous displacement of the housing mounting bracket 10128 relative to the hinge mechanism 1 in this state, and ensure reliability of the overall structure of the electronic device.

A connection manner of the second support arm 10123 and the housing mounting bracket 10128 is the same as a connection manner of the first support arm 10121 and the housing mounting bracket 10128. Therefore, in a motion process of the hinge mechanism 1, motion of the second support arm 10123 relative to the housing mounting bracket 10128 is similar to motion of the first support arm 10121 relative to the housing mounting bracket 10128. Details are not described herein again.

In this application, the third sliding block 101291 of the swing arm 10129 may use a straight-line structure shown in FIG. 12. In this case, the third sliding rail 1012831 may alternatively be adaptively disposed as a straight-line sliding rail shown in FIG. 14A. In addition, the straight-line sliding rail has an opening located on the first surface 101284. When the hinge mechanism 1 is in the unfolded state shown in FIG. 14A, the straight-line sliding rail extends from the opening to a direction of the base 102. This improves smoothness of sliding the third sliding block 101291 along the third sliding rail 1012831, reduces interference of another structure on the hinge mechanism 1 on the swing arm 10129, helps increase the wall thickness of the swing arm 10129, and improves structural reliability of the swing arm 10129. In some other possible implementations of this application, the opening of the straight-line sliding rail may alternatively extend from the opening to a direction away from the base 102; or the opening of the straight-line sliding rail may extend from the opening to a direction perpendicular to the second surface 101285, so that the third sliding rail 1012831 is disposed more flexibly. It should be noted that, in this application, the third sliding block 101291 herein may alternatively be in another shape that adapts to the straight-line sliding rail, for example, may be a sliding block in an overall straight-line form with a hollow and spacing design in a middle part, or may be a special-shaped sliding block, as long as the sliding block can fit the sliding rail in the straight-line form for sliding.

In addition to the foregoing straight-line structure, the third sliding block 101291 of the swing arm 10129 may alternatively be designed as a structure of another possible shape. For example, the second sliding block of the swing arm 10129 may alternatively be designed as an arc-shaped sliding block, and the arc-shaped sliding block may be, for example, a circular arc-shaped sliding block. In addition, to enable the arc-shaped sliding block of the swing arm 10129 to slide in the third sliding rail 1012831 of the third sliding groove 101283 of the housing mounting bracket 10128, the third sliding rail 1012831 may be adaptively designed as an arc-shaped sliding rail, and the arc-shaped sliding rail may be, for example, a circular arc-shaped sliding rail. When the hinge mechanism 1 is in the unfolded state, an axis center of the arc-shaped sliding rail is located on a side away from the base 102 of the arc-shaped sliding rail. This can help improve smoothness of sliding the third sliding block 101291 along the third sliding rail 1012831, enable the angle at which the swing arm 10129 rotates relative to the base 102 to be 90°, effectively reduce interference of another structure on the hinge mechanism 1 on motion of the swing arm 10129, and help increase the wall thickness of the swing arm 10129.

In this way, in this embodiment, sliding of the swing arm 10129 in the third sliding groove 101283 is sliding of the arc-shaped sliding block in the arc-shaped sliding rail. In this case, in the motion process of the hinge mechanism 1 from the unfolded state to the folded state, or from the folded state to the unfolded state, for motion of the first support arm 10121 and the swing arm 10129 relative to the housing mounting bracket 10128, refer to FIG. 14A to FIG. 14D. Details are not described herein again.

In some other possible embodiments of this application, when the hinge mechanism 1 is in the unfolded state, an axis center of the arc-shaped sliding rail may alternatively be located on a side that is of the arc-shaped sliding rail and that faces the base 102. In this way, in the process in which the hinge mechanism 1 rotates from the unfolded state to the folded state, the second sliding block of the swing arm 10129 slides in the second sliding rail 1012821 from the second surface 101285 of the first housing mounting bracket 10128 in a direction toward the first surface 101284. However, in the process in which the hinge mechanism 1 rotates from the folded state to the unfolded state, the third sliding block 101291 of the swing arm 10129 slides in the third sliding rail 1012831 from the first surface 101284 of the first housing mounting bracket 10128 in a direction toward the second surface 101285.

It should be noted that, in this application, when the third sliding rail 1012831 is an arc-shaped sliding rail, the third sliding block 101291 herein may alternatively be in another shape that adapts to the arc-shaped sliding rail, for example, may be a sliding block in an overall arc-shaped form with a hollow and spacing design in a middle part, or may be a special-shaped sliding block, as long as the sliding block can fit the arc-shaped sliding rail in form for sliding. In addition, when the third sliding rail 1012831 is a circular arc-shaped sliding rail, sliding of the third sliding block 101291 in the third sliding rail 1012831 may alternatively be understood as rotation of the third sliding block 101291 around the first housing mounting bracket 10128.

In this application, the projection along the second direction in the first cross section and the projection along the first direction in the first cross section are not parallel. In addition to intersection, the second direction and the first direction may be further in a tangent relationship or a separation relationship. This is not specifically limited in this application. For example, when the third sliding block 101291 of the swing arm 10129 is designed as an arc-shaped sliding block, in a process in which the hinge mechanism 1 rotates, a sliding track of the third sliding block 101291 of the swing arm 10129 is arc-shaped, for example, may be circular arc-shaped; and a sliding track of the first support arm 10121 is still straight-line-shaped. In this case, the sliding track of the third sliding block 101291 and the sliding track of the first support arm 10121 may intersect, be tangent, or be separated.

Figure 16:
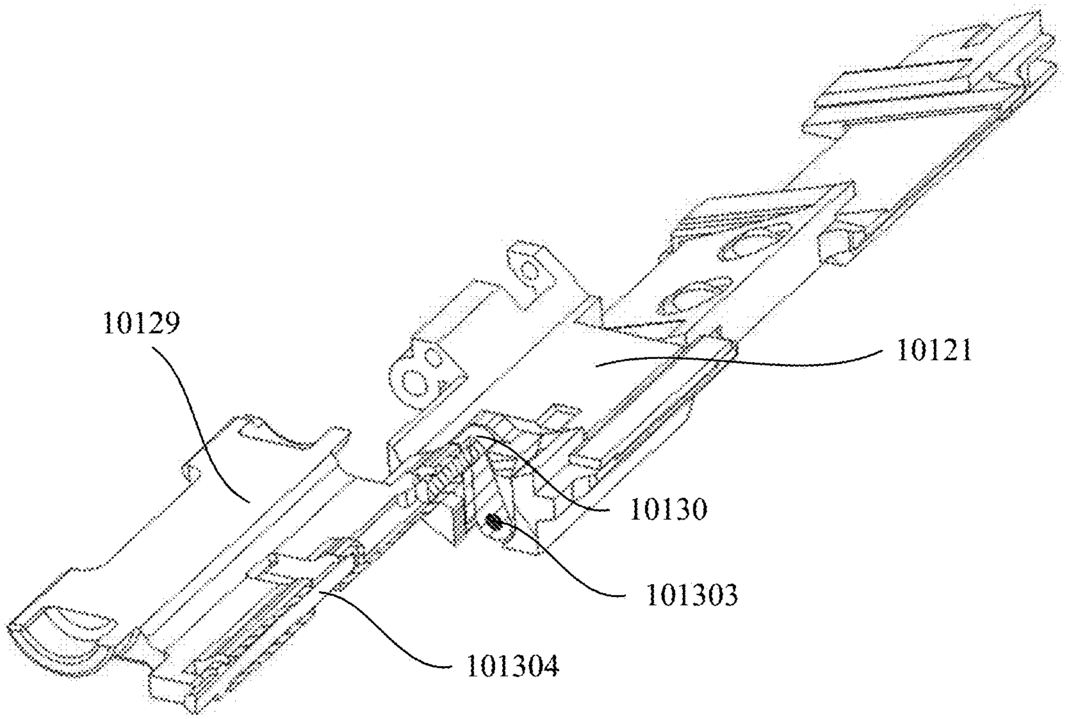
FIG. 16 is a B-B sectional view of a structure shown in FIG. 11.
Figure 17:
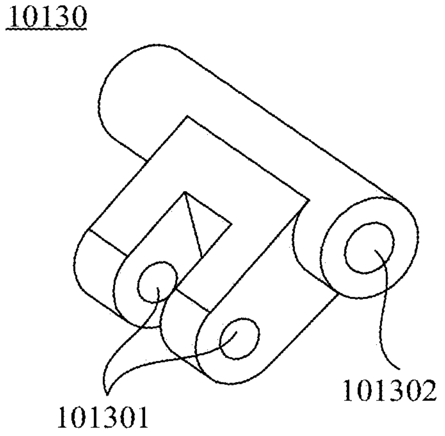
FIG. 17 is a diagram of a structure of a drive connecting rod according to an embodiment of this application.

In the foregoing embodiments of this application, to improve consistency and smoothness of motion of the first support arm 10121 and the swing arm 10129, and a combination degree between the first support arm 10121 and the swing arm 10129 and corresponding sliding grooves, refer to FIG. 16. FIG. 16 is a B-B sectional view of the structure shown in FIG. 11. The B-B sectional view may be used to show a connection relationship between the first support arm 10121 and the swing arm 10129. A drive connecting rod 10130 may be disposed between the first support arm 10121 and the swing arm 10129, and the drive connecting rod 10130 may be rotatably connected to the first support arm 10121 and the swing arm 10129. FIG. 17 is a diagram of a structure of the drive connecting rod 10130 according to a possible embodiment of this application. The drive connecting rod 10130 may include a first connection part 101301 and a second connection part 101302. Refer to FIG. 16 and FIG. 17 together. The first connection part 101301 is rotatably connected to the first support arm 10121 through a first connecting rod 101303, and the second connection part 101302 is rotatably connected to the swing arm 10129 through a second connecting rod 101304. It should be noted that axes of the first connecting rod 101303 and the second connecting rod 101304 do not coincide. This reduces a risk of interference caused to respective motion of the first support arm 10121 and the swing arm 10129.

The drive connecting rod 10130 is disposed between the first support arm 10121 and the swing arm 10129, so that when the hinge mechanism 1 is in the folded state, the first support arm 10121, the swing arm 10129, and the drive connecting rod 10130 can jointly support the housing mounting bracket 10128. This stops the housing mounting bracket 10128 while effectively improving a motion combination degree between the first support arm 10121 and the swing arm 10129 and the housing mounting bracket 10128. In this way, even if the electronic device in which the hinge mechanism 1 is used falls off in the folded state, the hinge mechanism can effectively reduce a risk of generating a large instantaneous displacement of the housing mounting bracket 10128 relative to the hinge mechanism 1 in this state, and ensure reliability of the overall structure of the electronic device.

To avoid over-constraint on motion of the first support arm 10121 and the swing arm 10129 due to disposition of the drive connecting rod 10130, the third sliding block 101291 of the swing arm 10129 may be further thinned, so that the third sliding block 101291 of the swing arm 10129 and the third sliding rail 1012831 of the housing mounting bracket 10128 may be in clearance fit. During specific implementation, a thickness of the third sliding block 101291 of the swing arm 10129 may be reduced, so that a gap exists between the third sliding block 101291 and a side wall of the third sliding rail 1012831. In this case, a shape of the third sliding block 101291 may match a shape of the third sliding rail 1012831, for example, when the third sliding rail 1012831 is a rectangular sliding rail, the third sliding block 101291 may be set as a rectangular sliding block. Alternatively, the third sliding block 101291 may also be set as a pin shaft, so that the third sliding block 101291 may also rotate relative to the third sliding rail 1012831 while sliding in the third sliding rail 1012831. Therefore, in a process in which the third sliding block 101291 slides along the third sliding rail 1012831, a degree of freedom of motion of the swing arm 10129 may be increased, and reliability of cooperation between the swing arm 10129 and the third sliding groove 101283 of the housing mounting bracket 10128 may be considered.

It should be noted that, in the foregoing embodiment, the drive connecting rod 10130 is rotatably connected to the first support arm 10121 through the first connecting rod 101303, and is rotatably connected to the swing arm 10129 through the second connecting rod 101304. In this way, the first support arm 10121, the first connecting rod 101303, the swing arm 10129, and the second connecting rod 101304 may form a four-link mechanism. It may be understood that, rod lengths between structures on the four-link mechanism are adjusted, so that the formed four-link structure can be in a parallel quadrilateral or non-parallel quadrilateral shape.

In addition, in addition to the disposing manner provided in the foregoing embodiment, the drive connecting rod 10130 may further use another possible disposing manner. For example, structures of the drive connecting rod 10130, the swing arm 10129, and the first support arm 10121 are appropriately designed, so that the first connection part 101301 of the drive connecting rod 10130 may be slidably connected to the swing arm 10129 through the first connecting rod 101303, and the second connection part 101302 is fastened to the first support arm 10121. For example, a guiding slot may be provided at an end that is of the swing arm 10129 and that faces the first support arm 10121. In this case, the first connecting rod 101303 may be inserted into the guiding slot, and may slide along a slot surface of the guiding slot, to implement a slidable connection between the first connecting rod 101303 and the swing arm 10129. In addition, the second connection part 101302 of the drive connecting rod 10130 may be fastened to the first support arm 10121 in a manner of bonding, threaded connection, or the like. In some other possible embodiments of this application, the drive connecting rod 10130 and the first support arm 10121 may be an integrated structure.

It may be understood that, in some possible embodiments of this application, the drive connecting rod 10130 may alternatively be slidably connected to the first support arm 10121, and fastened to the swing arm 10129. A specific disposing manner is similar to that in the embodiment in which the drive connecting rod 10130 is slidably connected to the swing arm 10129 and fastened to the first support arm 10121. Details are not described herein again.

In the disposing manner, the guiding slot can be appropriately designed for the drive connecting rod 10130, to improve a combination degree between the first support arm 10121 and the swing arm 10129 and the corresponding sliding grooves, improve motion consistency between the first support arm 10121 and the swing arm 10129, and enable motion of the first support arm 10121 and the swing arm 10129 smoother. In addition, when the electronic device in which the hinge mechanism 1 is used falls off in the folded state, the first support arm 10121, the swing arm 10129, and the drive connecting rod 10130 can jointly support a housing of the electronic device. This can avoid causing a large instantaneous displacement of the housing relative to the hinge mechanism 1, and improve reliability of the overall structure of the electronic device.

In addition, in this embodiment, to avoid over-constraint on motion of the first support arm 10121 and the swing arm 10129 due to disposition of the drive connecting rod 10130, the third sliding block 101291 of the swing arm 10129 may also be thinned, so that the third sliding block 101291 of the swing arm 10129 and the third sliding rail 1012831 of the first housing mounting bracket 10128 are in clearance fit.

For a specific disposing manner, refer to the foregoing embodiment. Details are not described herein.

In this application, to form the display accommodating space among the first support plate 10111, the second support plate 10127, and the base 102, the second support plate 10127 may be rotatably connected to the housing mounting bracket 10128. It should be noted that the second support plate 10127 may be rotatably connected to a plurality of housing mounting brackets 10128 located on a same side of the base 102. This helps simplify the structure of the hinge mechanism 1, and can improve structural reliability of the hinge mechanism 1. In addition, when the hinge mechanism 1 provided in this application is used in the electronic device, the first support plate 10111 may be fastened to one housing of the electronic device, or the first support plate 10111 is a part of one housing of the electronic device.

Figure 18:
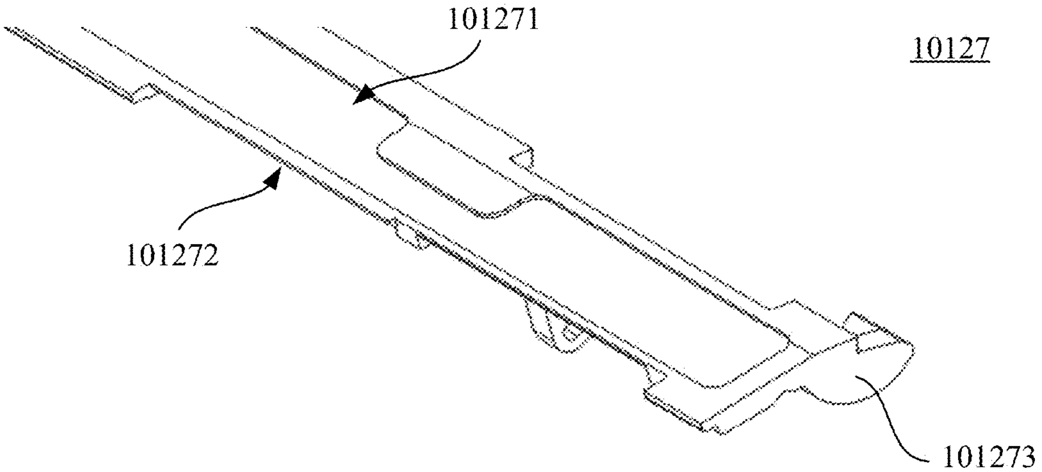
FIG. 18 is a diagram of a structure of a second support plate according to an embodiment of this application.

Specifically, when the second support plate 10127 is rotatably connected to the housing mounting bracket 10128, refer to the housing mounting bracket 10128 shown in FIG. 10. The housing mounting bracket 10128 may be further provided with a rotating slot 101286, and the rotating slot 101286 may be a circular arc-shaped groove. FIG. 18 is a diagram of a structure of the second support plate 10127 according to a possible embodiment of this application. In addition, a rotating part 101273 may be disposed at an end part that is of the second support plate 10127 and that faces the housing mounting bracket 10128, and the rotating part 101273 may be disposed as an arc-shaped rotating part, for example, a circular arc-shaped rotating part. In this case, the rotating part 101273 may be mounted in the rotating slot 101286, and the rotating part 101273 may slide along a slot surface of the rotating slot 101286 to implement relative rotation between the first support plate 10111 and the housing mounting bracket 10128.

Figure 19:
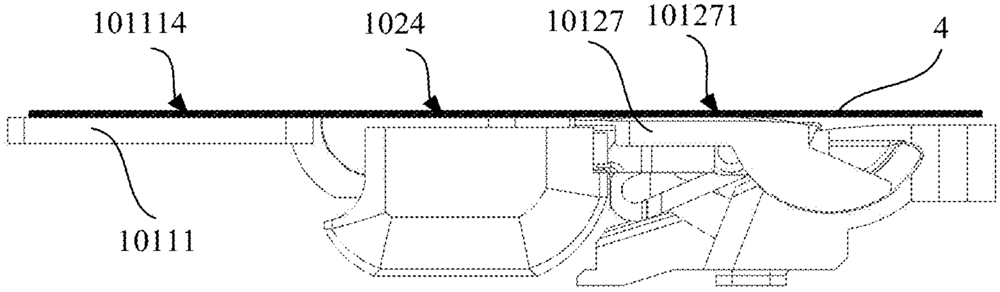
FIG. 19 is a diagram of a structure supporting a flexible display by two support plates according to an embodiment of this application.

FIG. 19 is a diagram of a structure supporting the flexible display 4 by the first support plate 10111 and the second support plate 10127 according to a possible embodiment of this application. In FIG. 19, when the electronic device is in an unfolded state, the first plate surface 101114 of the first support plate 10111, the third plate surface 101271 of the second support plate 10127, and the bearing surface 1024 of the base 102 may be located on a same plane, so that the flexible display 4 can be smoothly supported.

Figure 20:
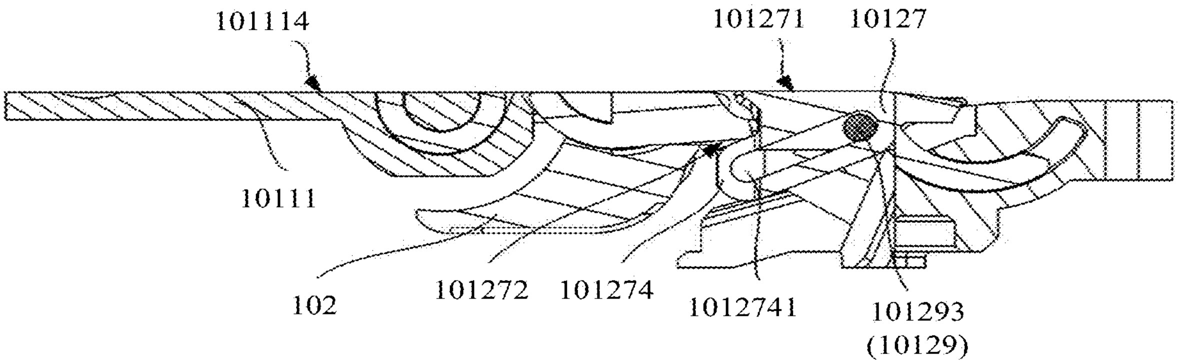
FIG. 20 is a sectional view of a hinge mechanism according to an embodiment of this application.

FIG. 20 is a possible sectional view of the hinge mechanism 1 according to an embodiment of this application. FIG. 20 may be used to show a structure of the fourth plate surface 101272 of the second support plate 10127, and a connection relationship between the second support plate 10127 and another structure of the hinge mechanism 1. A first guiding part 101274 may be disposed on a fourth plate surface 101272 of the second support plate 10127, and a first track slot 1012741 may be provided on the first guiding part 101274. In addition, in this application, a first guiding structure 101293 may be further disposed on the swing arm 10129. The first guiding structure 101293 may be but is not limited to a columnar structure, and the first guiding structure 101293 may be inserted into the first track slot 1012741 of the first guiding part 101274 of the second support plate 10127, and may slide along the first track slot 1012741. In this way, in a process in which the swing arm 10129 rotates around the base 102, the first guiding structure 101293 may slide in the first track slot 1012741, to drive the second support plate 10127 to rotate around the housing mounting bracket 10128.

In another possible embodiment of this application, the first support arm 10121 may further drive the second support plate 10127 to rotate around the housing mounting bracket 10128. During specific implementation, the first guiding part 101274 may be disposed on the fourth plate surface 101272 of the second support plate 10127, and the first track slot 1012741 may be provided on the first guiding part 101274. In addition, a first guiding structure 101293 may be disposed on the first support arm 10121. The first guiding structure 101293 may be but is not limited to a columnar structure, and the first guiding structure 101293 may be inserted into the first track slot 1012741 of the first guiding part 101274 of the second support plate 10127, and may slide along the first track slot 1012741. In this way, in a process in which the first support arm 10121 rotates around the base 102, the first guiding structure 101293 may slide in the first track slot 1012741, to drive the second support plate 10127 to rotate around the housing mounting bracket 10128. In some possible embodiments of this application, the second support plate 10127 may alternatively be slidably connected to both the first support arm 10121 and the swing arm 10129. For a slidable connection manner, refer to the foregoing embodiments. Details are not described herein again. Therefore, the first support arm 10121 and the swing arm 10129 rotate around the base 102, to drive the second support plate 10127 to rotate around the housing mounting bracket 10128.

Figure 21:
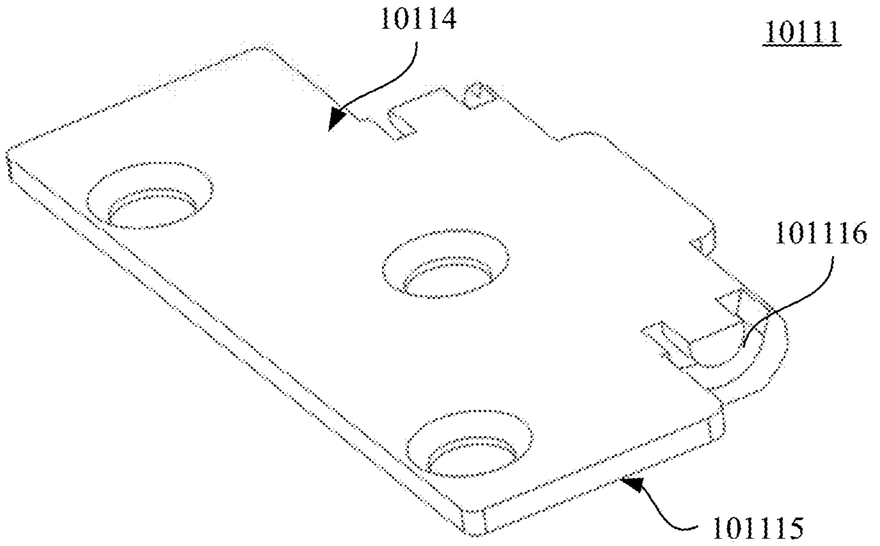
FIG. 21 is a diagram of a structure of a first support plate according to an embodiment of this application.
Figure 22:
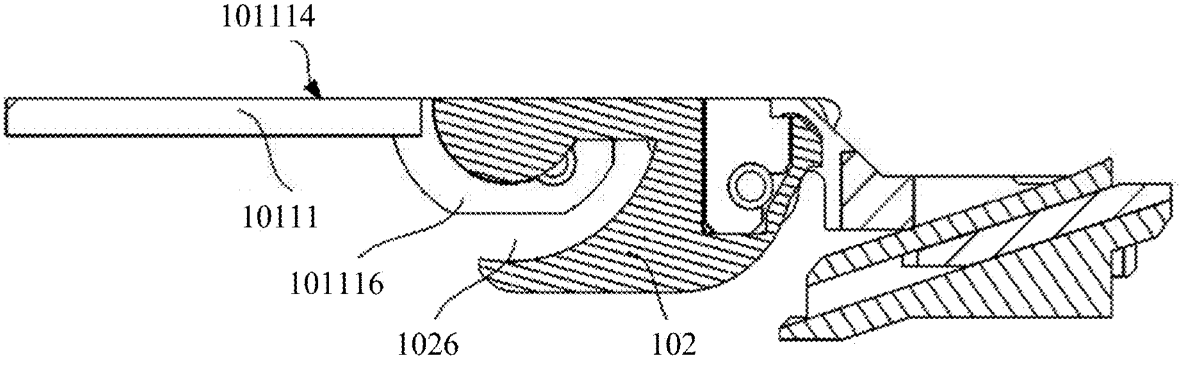
FIG. 22 is a sectional view of a hinge mechanism according to another embodiment of this application.

FIG. 21 is a diagram of a structure of the first support plate 10111 according to a possible embodiment of this application. In this application, the first support plate 10111 and the base 102 are in a single-axis rotatable connection manner, and rotation axis centers of the first support plate 10111 and the second support plate 10127 do not coincide. During specific implementation, a first arc-shaped rotating block 101116 may be disposed at an end that is of the first support plate 10111 and that is rotatably connected to the base 102. FIG. 22 is another possible sectional view of the hinge mechanism 1 according to an embodiment of this application. The base 102 may be further provided with a first arc-shaped groove 1026, and the first arc-shaped rotating block 101116 may slide along a groove surface of the first arc-shaped groove 1026, so that the first support plate 10111 may be rotatably connected to the base 102 through a virtual shaft. This helps reduce space occupied by the first support plate 10111 on the base 102, to implement a miniaturization design of the hinge mechanism 1. In another possible embodiment of this application, the first support plate 10111 may alternatively be rotatably connected to the base 102 through a physical rotating shaft, to improve reliability of the connection between the first support plate 10111 and the base 102.

In this way, in a possible embodiment of this application, when the hinge mechanism 1 includes a plurality of main shaft assemblies, first support plates 10111 of the main shaft assemblies disposed opposite to the flexible display 4 of the electronic device may be rotatably connected to the base 102 through a virtual shaft, and first support plates 10111 of the main shaft assemblies located at two end parts in the length direction of the hinge mechanism 1 may be rotatably connected to the base 102 through a solid shaft.

Figure 23:
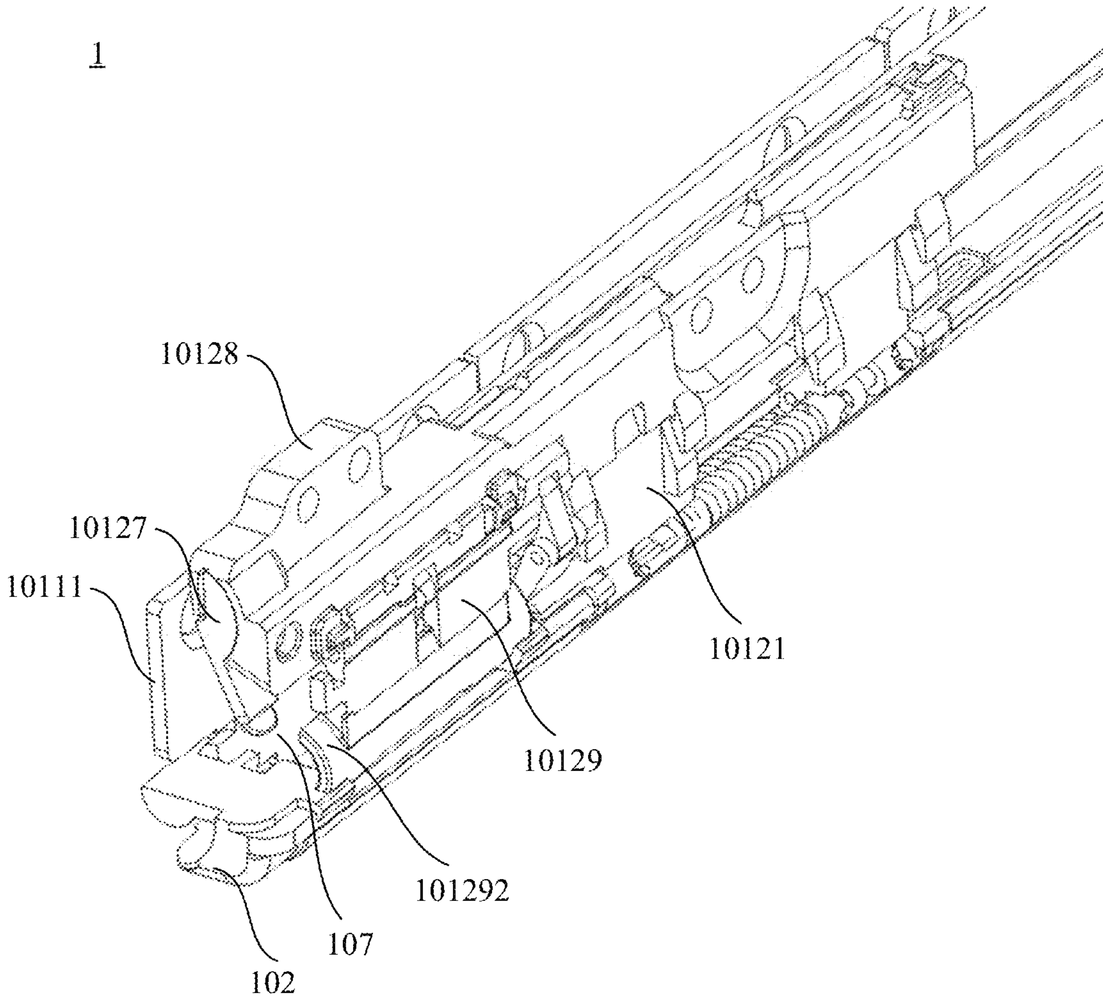
FIG. 23 is a diagram of a structure of a hinge mechanism in a folded state according to another embodiment of this application.

It can be learned from the foregoing that when the first rotating assembly 1011 and the second rotating assembly 1012 rotate toward each other, the first support arm 10121 or the swing arm 10129 may drive an end that is of the second support plate 10127 and that is close to the base 102 to move in a direction away from the base 102. FIG. 23 shows that when the hinge mechanism 1 is in the folded state, the first support plate 10111, the second support plate 10127, and the base 102 may form the display accommodating space 107. It may be understood from the foregoing description of the structure of the hinge mechanism 1 that, in the process in which the electronic device changes from the unfolded state to the folded state, the second support plate 10127 may rotate around the housing mounting bracket 10128 under the driving of the swing arm 10129 and/or the first support arm 10121, so that the end part that is of the second support plate 10127 and that is close to the base 102 may move in the direction away from the base 102. The first support plate 10111 is always connected to the base 102 via the first arc-shaped rotating block 101116, so that the first rotating assembly 1011 and the second rotating assembly 1012 of the hinge mechanism 1 are asymmetrically disposed relative to each other or relative to the base 102. Such a design can effectively reduce the width of the hinge mechanism 1, enable the structure of the hinge mechanism 1 to be simple, and reduce the weight of the hinge mechanism 1.

Figure 24:
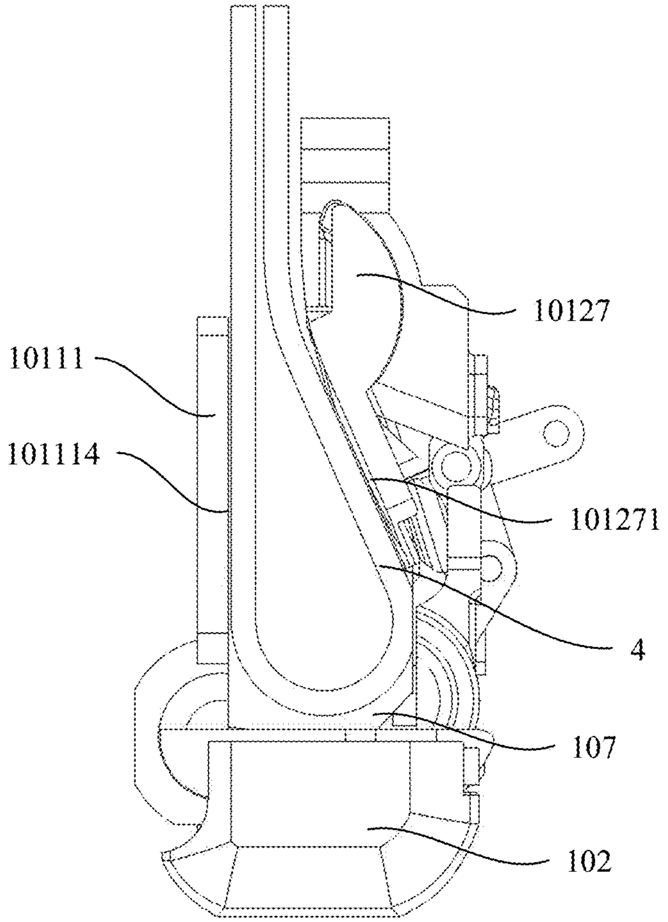
FIG. 24 is a sectional view of a hinge mechanism in a folded state according to an embodiment of this application.

In addition, FIG. 24 is a structure in which when the hinge mechanism 1 is in the folded state, a bent part of the flexible display 4 is accommodated in the display accommodating space 107 formed by the first support plate 10111, the second support plate 10127, and the base 102. It can be learned from FIG. 24 that the display accommodating space 107 formed between the first support plate 10111, the second support plate 10127, and the base 102 may be a triangular interval that tilts toward a side of the second support plate 10127, so that a bent part that is of the flexible display 4 and that is accommodated in the display accommodating space 107 is in an eccentric water-drop-like form shown in FIG. 24. This can prevent the flexible display 4 from being squeezed, effectively reduce a crease width of the flexible display 4 while reducing a risk of damage to the flexible display 4, and help improve user experience.

Figure 25:
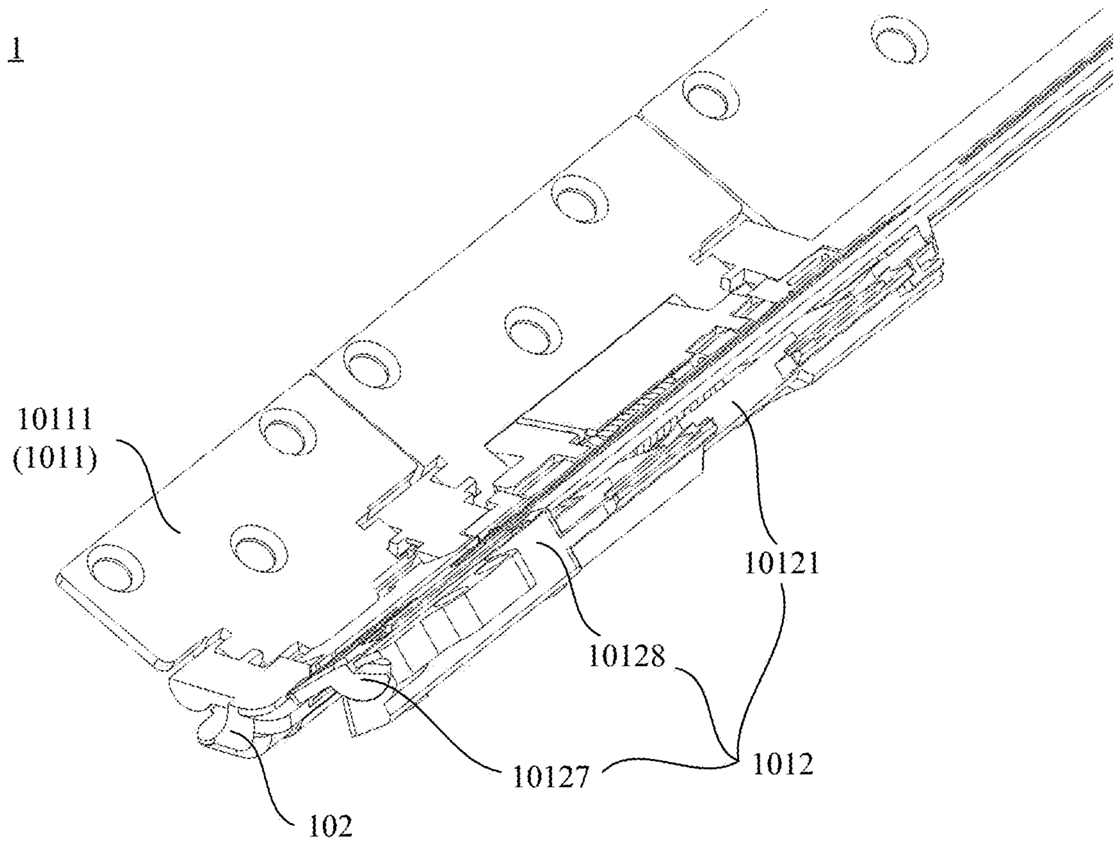
FIG. 25 is a diagram of a structure of a hinge mechanism in an intermediate state according to another embodiment of this application.

FIG. 25 is a diagram of a structure of the hinge mechanism 1 in an intermediate state according to this application. In this application, the first rotating assembly 1011 and the second rotating assembly 1012 may synchronously rotate away from each other. For example, in a rotation process from the folded state shown in FIG. 23 to the intermediate state shown in FIG. 25, the first rotating assembly 1011 and the second rotating assembly 1012 synchronously rotate toward each other.

In addition, because the first support arm 10121 may slide along the first sliding groove 101281 of the housing mounting bracket 10128, in the process in which the first support arm 10121 rotates around the base 102, the housing mounting bracket 10128 may be driven to rotate at the same angle. In addition, because the housing mounting bracket 10128 may be fastened to one housing of the electronic device, the housing of the electronic device may rotate at the same angle as the first support arm 10121. In addition, in this application, the first support plate 10111 may be fastened to the other housing of the electronic device. In this case, in the process in which the first support arm 10121 rotates around the base 102, the first support plate 10111 may be driven to rotate at the same angle, so that the other housing of the electronic device can rotate at the same angle as the first support plate 10111. In this way, synchronous reverse rotation of the first rotating assembly 1011 and the second rotating assembly 1012 can implement synchronous reverse rotation of the two housings of the electronic device. This can avoid applying an instantaneous action force to the flexible display 4 fastened to the two housings, and help improve reliability of the flexible display 4.

In addition, the housing mounting bracket 10128 is provided with the first sliding groove 101281, the second sliding groove 101282, and the third sliding groove 101283, and in a process in which the housing mounting bracket 10128 rotates around the base 102, the first support arm 10121 slides in the first sliding groove 101281 in the first direction, the second support arm 10123 slides in the second sliding groove 101282 in the first direction, and the swing arm 10129 slides in the third sliding groove 101283 in the second direction. In addition, a projection along the first direction in the first cross section may intersect a projection along the second direction in the first cross section, where the first cross section may be a reference plane that is perpendicular to the rotation axis of the first support arm 10121 and the rotation axis of the swing arm 10129. Therefore, when the first support arm 10121 and the swing arm 10129, and the second support arm 10123 and the swing arm 10129 rotate around the base 102, rotation axis centers of the first support arm 10121 and the swing arm 10129, and the second support arm 10123 and the swing arm 10129 do not coincide. In this way, a phase difference motion between axis centers of the first support arm 10121 and the swing arm 10129, and a phase difference motion between axis centers of the second support arm 10123 and the swing arm 10129 can be implemented. In addition, providing directions of the first sliding groove 101281, the second sliding groove 101282, and the third sliding groove 101283 are appropriately designed, so that rotation angles of the first support arm 10121, the second support arm 10123, and the swing arm 10129 relative to the base 102 are all 90°, or even less than 90°. For example, in the hinge mechanism 1 provided in this application, a rotation angle of the swing arm 10129 may be adjusted by adjusting the first track slot 1012741 of the second support plate 10127, so that a maximum rotation angle of the swing arm 10129 is less than or equal to 90°. Refer to FIG. 23 and FIG. 24 together. When the electronic device is in the folded state, a distance between the second arc-shaped rotating block 101292 of the swing arm 10129 and the flexible display 4 is long. This can prevent the swing arm 10129 from squeezing or pulling the flexible display 4, reduce the risk of damage to the flexible display 4, and prolong the service life of the flexible display 4.

In addition, the first support plate 10111 is always connected to the base 102 through the first arc-shaped rotating block 101116, so that when the electronic device is in the folded state, the display accommodating space 107 formed by the hinge mechanism 1 can be a tilted triangular interval. This can enable the bent part of the flexible display 4 accommodated in the display accommodating space 107 to be in the eccentric water-drop-like form, helps reduce the width of the bent area of the flexible display 4, improve light and shadow of the flexible display 4, and helps improve user experience.

Figure 26:
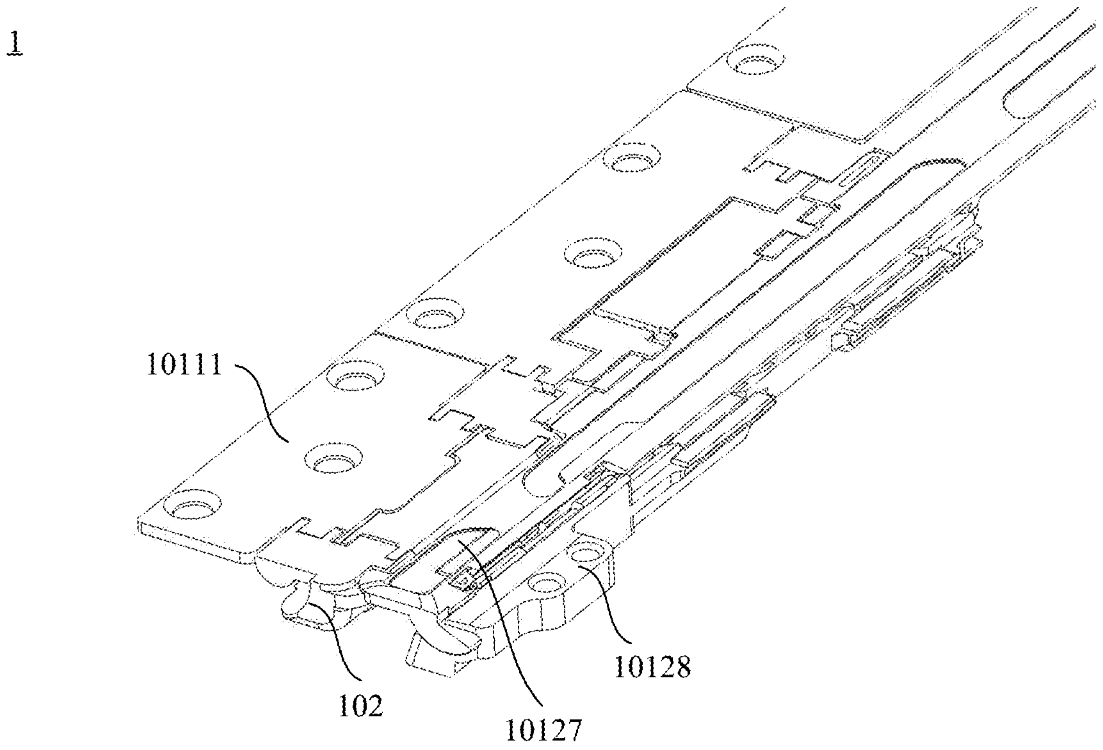
FIG. 26 is a diagram of a structure of a hinge mechanism in a folded state according to another embodiment of this application.

It should be noted that, refer to FIG. 24. In this application, the flexible display 4 of the electronic device may be fastened to the first support plate 10111 and the second support plate 10127, and a connection manner may be but is not limited to bonding. During specific implementation, the flexible display 4 may be bonded to a partial area of the first plate surface 101114 of the first support plate 10111, for example, may be bonded to a partial area that is of the first plate surface 101114 and that is close to a housing at a corresponding side, and the flexible display 4 may be bonded to a partial area of the third plate surface 101271 of the second support plate 10127, for example, may be bonded to a partial area that is of the third plate surface 101271 and that is close to the base 102. Therefore, when the hinge mechanism 1 is in the unfolded state shown in FIG. 26, the first support plate 10111, the second support plate 10127, and the base 102 can jointly smoothly support the flexible display 4. In a process in which the hinge mechanism 1 changes from the unfolded state to the folded state, the two support plates can drive the flexible display 4 to rotate. This can effectively avoid deformation of the flexible display 4, to reduce a risk of damage to the flexible display 4. In addition, when the hinge mechanism 1 is in the folded state shown in FIG. 24, the flexible display 4 may be attached to the two support plates. This can help improve light and shadow of the flexible display 4.

In the hinge mechanism 1 provided in this application, in addition to the slidable connection manner provided in the foregoing embodiments between the swing arm 10129 of the second rotating assembly 1012 and the housing mounting bracket 10128, in some possible embodiments, the swing arm 10129 may be connected to the housing mounting bracket 10128 in another possible manner.

Figure 27:
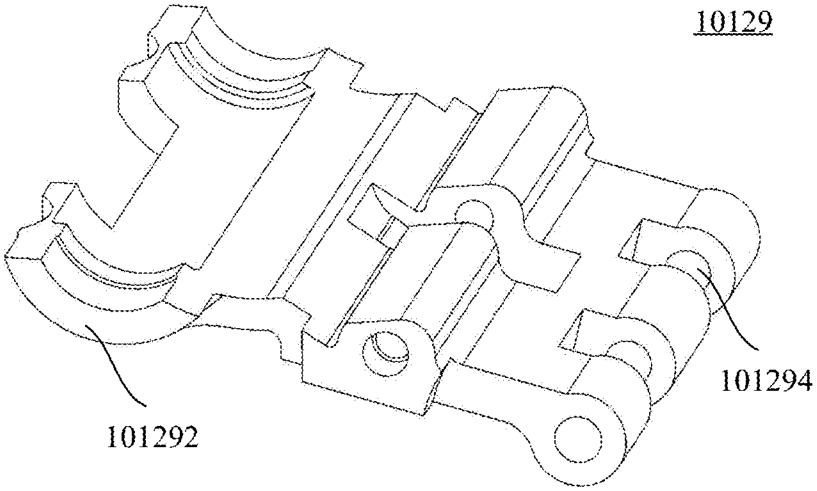
FIG. 27 is a diagram of a structure of a swing arm according to another embodiment of this application.

For example, the swing arm 10129 may be rotatably connected to the housing mounting bracket 10128. FIG. 27 is a diagram of a structure of the swing arm 10129 according to another possible embodiment of this application. A mounting hole 101294 is provided at an end that is of the swing arm 10129 and that is configured to mount the housing mounting bracket 10128.

Figure 28:
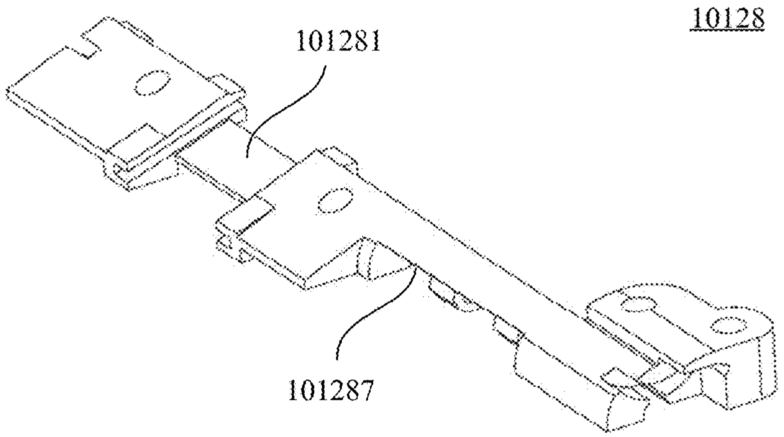
FIG. 28 is a diagram of a structure of a housing mounting bracket according to another embodiment of this application.

In addition, FIG. 28 is a diagram of a structure of the housing mounting bracket 10128 according to another possible embodiment of this application. The housing mounting bracket 10128 is provided with a mounting part 101287, and in a length direction of the housing mounting bracket 10128, the mounting part 101287 and the first sliding groove 101281 are spaced apart. In this case, the mounting hole 101294 may be rotatably connected to the mounting part 101287 through a rotating shaft. In another possible embodiment of this application, the housing mounting bracket 10128 may be provided with a mounting hole 101294, and the mounting part 101287 is disposed on the swing arm 10129. In this case, the mounting hole 101294 may also be rotatably connected to the mounting part 101287 through a rotating shaft.

In this embodiment of this application, for a manner of connecting the swing arm 10129 to the base 102 and a manner of connecting the first support arm 10121 to the housing mounting bracket 10128, refer to any one of the foregoing embodiments. For example, the swing arm 10129 may be rotatably connected to the second arc-shaped groove 1025 of the base 102 through the second arc-shaped rotating block 101292, and the first support arm 10121 may slide along the first sliding groove 101281 of the housing mounting bracket 10128. Alternatively, the second rotating assembly 1012 further includes a second support arm 10123, and the second support arm 10123 may slide along the second sliding groove 101282 of the housing mounting bracket 10128. Details are not described herein.

The hinge mechanism 1 provided in the foregoing embodiments of this application may be used in, for example, the electronic device shown in FIG. 2. The first rotating assembly 1011 may be fastened to one housing located on a same side of the base 102, and the second rotating assembly 1012 may be fastened to the other housing. For example, the first support plate 10111 may be fastened to the first housing 2 of the electronic device shown in FIG. 2, and the housing mounting bracket 10128 of the second rotating assembly 1012 may be fastened to the second housing 3 of the electronic device shown in FIG. 2. The first support plate 10111 may be a part of a middle frame of the first housing 2, that is, the first support plate 10111 and the middle frame of the first housing 2 are integrally formed. In addition, the second support plate 10127 may alternatively be independent, and may be fastened to the first housing 2 in a possible manner such as bonding or threaded connection.

Figure 29A:
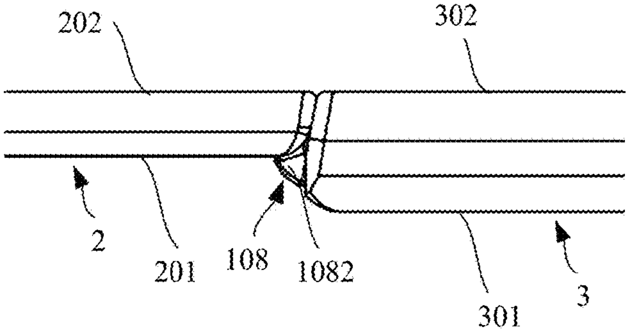
FIG. 29A is a diagram of a structure of an electronic device in an unfolded state according to another embodiment of this application.

In this application, when the electronic device is in the unfolded state shown in FIG. 29A, the bearing surface 1024 of the base 102, the first support surface 202 of the first housing 2, the second support surface 302 of the second housing 3, the first plate surface 101114 of the first support plate 10111, and the third plate surface 101271 of the second support plate 10127 may jointly smoothly support the flexible display 4, to ensure that a form of the flexible display 4 of the electronic device is complete in the unfolded state.

Figure 29B:
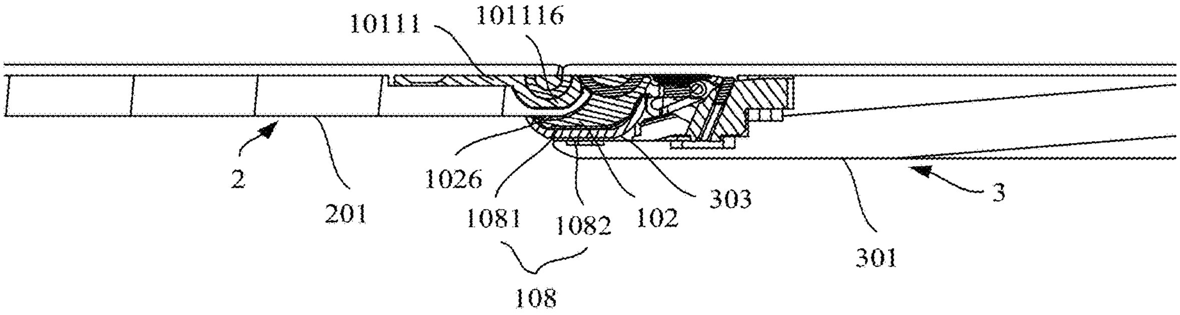
FIG. 29B is a sectional view of the electronic device shown in FIG. 29A.

In addition, to ensure integrity of an appearance surface of the electronic device, the electronic device may further include an end cover 108. In addition to being used as an appearance part of the electronic device, the end cover 108 may further protect a structure in the hinge mechanism 1. FIG. 29B is a sectional view of the electronic device shown in FIG. 29A. In this application, the end cover 108 may be provided with a first accommodating groove 1081, and at least a part of the base 102 may be accommodated in the first accommodating groove 1081. In addition, when the electronic device is in the unfolded state shown in FIG. 29B, at least a part of the first appearance surface 201 of the first housing 2 may be in lap joint with a groove surface of the first accommodating groove 1081, so that in this state, a complete appearance surface exists between the first housing 2 and the end cover 108.

It should be noted that, in a possible embodiment of this application, the first housing 2 may be of an integrated structure, and an appearance surface of the first housing 2 is an appearance surface of the integrated structure. In some other possible embodiments of this application, the first housing 2 may alternatively be an assembled part, for example, an assembled part of a middle frame and a cover plate disposed on the middle frame. In this case, the cover plate may be located on a side that is of the middle frame and that is away from the flexible display, and the appearance surface of the first housing 2 is a surface that is of the cover plate and that is away from the flexible display.

FIG. 29B, an end part that is of the second housing 3 and that faces the hinge mechanism 1 may be further provided with a second accommodating groove 303. The end cover 108 is provided with a third appearance surface 1082, and the third appearance surface 1082 is a surface that is of the end cover 108 and that is away from the base 102. When the electronic device is in the unfolded state shown in FIG. 29B, at least a part of the third appearance surface 1082 may be in lap joint with a groove surface of the second accommodating groove 303, so that in this state, a complete appearance surface exists between the second housing 3 and the end cover 108.

Based on this, when the electronic device is in the unfolded state shown in FIG. 29A and FIG. 29B, the first appearance surface 201 of the first housing 2, the third appearance surface 1082 of the end cover 108, and the second appearance surface 301 of the second housing 3 are seamlessly connected to jointly form an appearance surface of the electronic device. Therefore, when the electronic device is in the unfolded state, the electronic device has a complete appearance surface, and appearance aesthetics of the electronic device is effectively improved. In addition, when the electronic device is in the unfolded state, refer to FIG. 2 and FIG. 29A together. A spacing between the first appearance surface 201 and the flexible display 4 is less than a spacing between the second appearance surface 301 and the flexible display 4, so that a non-equal thickness design of the first housing 2 and the second housing 3 can be implemented. This design can make a side of the first housing 2 small in thickness and light in weight, and can simplify a structure of the first housing 2. This helps reduce a structure of the electronic device and reduce a weight of the electronic device, thereby improving user experience.

In a possible embodiment of this application, similar to the first housing 2, the second housing 3 may be of an integrated structure, and an appearance surface of the second housing 3 is an appearance surface of the integrated structure. In some other possible embodiments of this application, the second housing 3 may alternatively be an assembled part. For example, the second housing 3 may be an assembled part of a middle frame and a cover plate disposed on the middle frame. In this case, the cover plate may be located on a side that is of the middle frame and that is away from the flexible display, and the appearance surface of the second housing 3 is a surface that is of the cover plate and that is away from the flexible display.

In addition, refer to FIG. 29B, the electronic device may further implement a non-equal thickness design of the first housing 2 and the second housing 3 by using the foregoing design. This can help simplify a structure of the electronic device and reduce a weight of the entire electronic device. It may be understood that, in the design manner of the electronic device provided in this application, a structure with a large thickness, like a battery, in the electronic device may be disposed in the second housing 3, and only a component with a small thickness, like a display circuit board, may be disposed in the first housing 2, so that components of the electronic device can be appropriately arranged.

In this application, the first arc-shaped groove 1026 of the base 102 may be of an entire hollowed-out structure. Refer to FIG. 5 and FIG. 13. A part of that is the base 102 and that faces the first housing 2 is hollowed out to form a first arc-shaped groove 1026 that is continuous and extends in an axial direction of the hinge mechanism 1. In addition, refer to FIG. 29B, when the electronic device is in the unfolded state, at least a part of the first housing 2 may be accommodated in the first arc-shaped groove 1026, and a part that is of the first housing 2 and that is accommodated in the first arc-shaped groove 1026 may also be designed as an arc-shaped structure, so that the part of the first housing 2 can rotate in the first arc-shaped groove 1026 in a process in which the first housing 2 rotates around the base 102. In this application, the part that is of the first housing 2 and that is accommodated in the first arc-shaped groove 1026 may be designed as a standard circular arc-shaped structure, and a surface that is of the part and that is away from the flexible display may be a circular-arc surface. In some other possible embodiments of this application, a part that is of the first housing 2 and that is accommodated in the first arc-shaped groove 1026 may also be designed as a non-standard circular-arc structure, and a surface that is of the part and that is away from the flexible display may be formed by connecting a plurality of circular-arc surface sections, provided that at least a part of the first housing 2 can rotate in the first arc-shaped groove 1026, and interference between the part of the first housing 2 and the first arc-shaped groove 1026 may be avoided.

Referring to FIG. 29B, because the first arc-shaped rotating block 101116 of the first support plate 10111 may also rotate in the first arc-shaped groove 1026, in this application, a surface, facing the flexible display 4, of the part that is of the first housing 2 and that is accommodated in the first arc-shaped groove 1026 is attached to a surface that is of the first arc-shaped rotating block 101116 and that is away from the flexible display 4. Therefore, the part that is of the first housing 2 and that is accommodated in the first arc-shaped groove 1026 and the first arc-shaped rotating block 101116 can rotate around the base 102 through a same axis center.

Figure 30A:
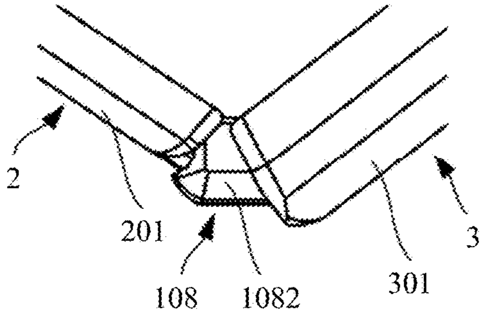
FIG. 30A is a diagram of a structure of an electronic device in an intermediate state according to another embodiment of this application.
Figure 30B:
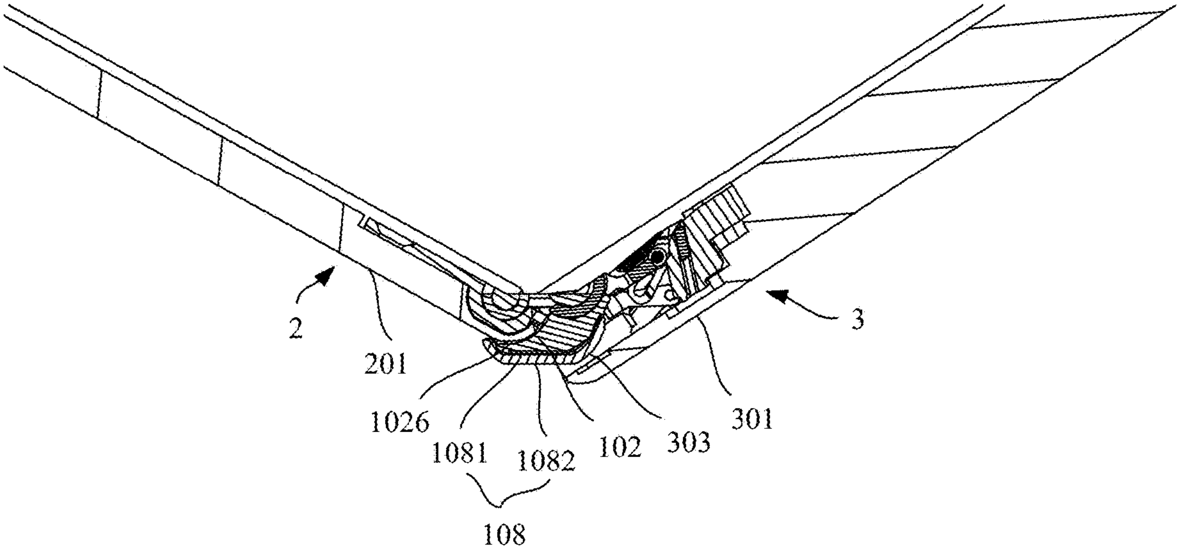
FIG. 30B is a sectional view of the electronic device shown in FIG. 30A.

In a process in which the electronic device moves from the unfolded state to the folded state shown in FIG. 29B, except that at least a part of the first housing 2 may rotate in the first arc-shaped groove 1026 of the base 102, at least a part of the third appearance surface 1082 may slide relative to a groove surface of the second accommodating groove 303. FIG. 30A is a diagram of a structure of the electronic device in an intermediate state. FIG. 30B is a sectional view of the electronic device shown in FIG. 30A. It can be learned from comparison between FIG. 29B and FIG. 30B that, in a process in which the electronic device changes from the unfolded state to the folded state, the first appearance surface 201 may move in a direction away from the second appearance surface 301 relative to the groove surface of the first accommodating groove 1081. In addition, the second appearance surface 301 moves in a direction away from the first appearance surface 201 relative to the third appearance surface 1082.

Figure 31A:
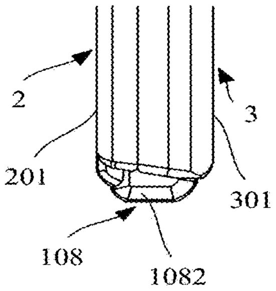
FIG. 31A is a diagram of a structure of an electronic device in an unfolded state according to another embodiment of this application.
Figure 31B:
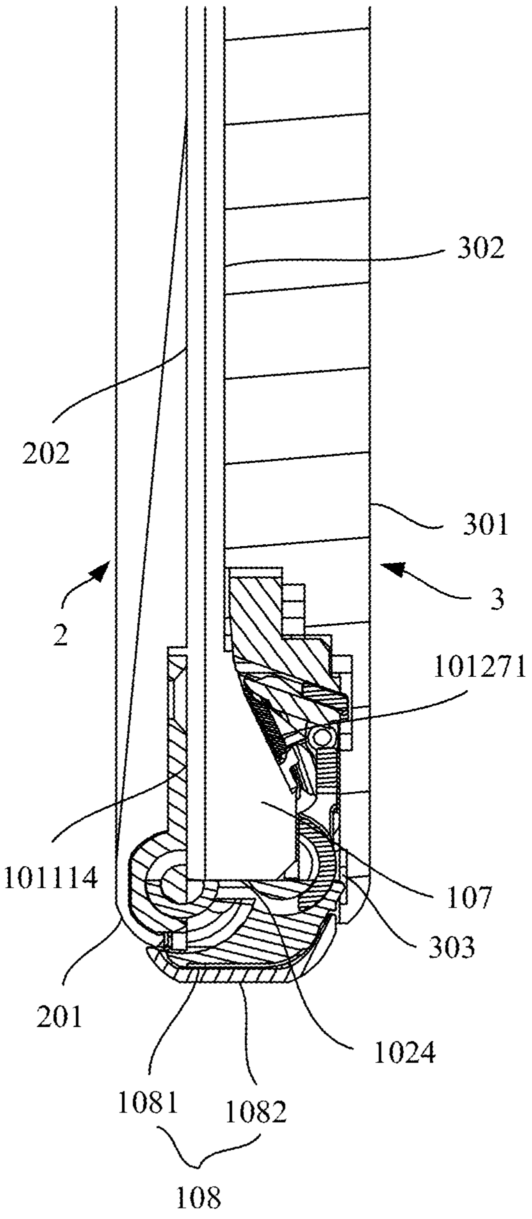
FIG. 31B is a sectional view of the electronic device shown in FIG. 31A.

FIG. 31A is a diagram of a structure of the electronic device in the folded state. FIG. 31B is a sectional view of the electronic device shown in FIG. 31A. It can be learned from comparison between FIG. 30B and FIG. 31B that, in a process in which the electronic device changes from the intermediate state to the folded state, the first appearance surface 201 continues to slide in a direction away from the second appearance surface 301 relative to the groove surface of the first accommodating groove 1081. The third appearance surface 1082 continues to move in a direction away from the second appearance surface 301 relative to the groove surface of the second accommodating groove 303. When the electronic device is in the folded state shown in FIG. 31B, the first appearance surface 201 is in lap joint with the groove surface of the first accommodating groove 1081 again, so that a complete appearance surface exists between the first housing 2 and the end cover 108. In addition, in the folded state, the third appearance surface 1082 is in lap joint with the groove surface of the second accommodating groove 303 again, so that a complete appearance surface exists between the second housing 3 and the end cover 108.

Therefore, when the electronic device is in the unfolded state shown in FIG. 31A and FIG. 31B, the first appearance surface 201 of the first housing 2, the third appearance surface 1082 of the end cover 108, and the second appearance surface 301 of the second housing 3 are seamlessly connected to jointly form an appearance surface of the electronic device. Therefore, when the electronic device is in the folded state, the electronic device has a complete appearance surface, and appearance aesthetics of the electronic device is effectively improved. In addition, when the electronic device is in the folded state, a spacing between the first appearance surface 201 and the flexible display 4 is also less than a spacing between the second appearance surface 301 and the flexible display 4, so that a non-equal thickness design of the first housing 2 and the second housing 3 can be implemented. This design can make a side of the first housing 2 small in thickness and light in weight, and can simplify a structure of the first housing 2. This helps reduce a structure of the electronic device and reduce a weight of the electronic device, thereby improving user experience.

It may be understood that a process of changing the electronic device from the folded state to the unfolded state is a process from FIG. 31A to FIG. 29A. In this process, relative positions of the first appearance surface 201, the second appearance surface 301, and the third appearance surface 1082 are reverse to those in a process of changing the electronic device from the unfolded state to the folded state. Details are not described herein again.

It should be noted that, in this application, when the electronic device is in the folded state, the first plate surface 101114 and the first support surface 202 may be located in a same plane, and may support the flexible display 4 when the electronic device is in the unfolded state. This helps implement smooth support for the flexible display 4, simplifies a mechanism design, and reduces difficulty of bonding the flexible display 4, to improve structural reliability of the flexible display 4.

When the electronic device in this application is in the folded state, an included angle between the first plate surface 101114 and the first support surface 202 may be less than an included angle between the third plate surface 101271 and the second support surface 302, to form the display accommodating space 107 among the first plate surface 101114, the third plate surface 101271, and the bearing surface 1024. It can be learned from the foregoing description of the hinge mechanism 1 that, the display accommodating space 107 is a tilted triangular interval. This can help reduce the volume and the weight of the hinge mechanism 1, enable the electronic device to reserve sufficient space for disposing other components. This helps improve performance of the electronic device. In addition, the bent part that is of the flexible display 4 and that is accommodated in the display accommodating space 107 is in the eccentric water-drop-like form. This helps reduce the width of bent part of the flexible display 4, and improve user experience.

It should be understood that, to implement the form of the electronic device, this application is not limited to embodiments of the hinge mechanisms 1 mentioned above, provided that the hinge mechanisms 1 in the following states can be implemented.

When the electronic device is in the folded state and the unfolded state, the first appearance surface 201 is in lap joint with a groove surface of the first accommodating groove 1081, and the third appearance surface 1082 is in lap joint with a groove surface of the second accommodating groove 303, to implement a thinning design on a side of the first housing 2 of the electronic device. This simplifies a structure of the electronic device, reduces a weight, and reduces a thickness of the electronic device in the folded state. In addition, when the electronic device is in the folded state, an included angle between the first plate surface 101114 and the first support surface 202 is less than an included angle between the third plate surface 101271 and the second support surface 302, to form the display accommodating space 107 among the first plate surface 101114, the third plate surface 101271, and the bearing surface 1024. Alternatively, when the electronic device is in the folded state, an included angle between the first plate surface 101114 of the first support plate 10111 and the bearing surface 1024 is greater than an included angle between the third plate surface 101271 of the second support plate 10127 and the bearing surface 1024, so that triangular display accommodating space 107 that tilts towards a side of the first support plate 10111 may be formed between the first plate surface 101114, the second plate surface 101115, and the bearing surface 1024.

In addition, in this application, the first track slot 1012741 of the second support plate 10127 can be appropriately designed, so that when the electronic device is in the folded state, enough accommodating space is formed between the two support plates and the base 102 to accommodate the bent part of the flexible display 4. This can avoid the gap at the hinge mechanism 1 of the electronic device, and ensure that the form of the electronic device in the folded state is complete, and can avoid damage to the flexible display 4 caused by a foreign matter inserted into the electronic device at the hinge mechanism 1, and implement the thinning design of the overall thickness of the electronic device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A foldable electronic device, comprising:

a hinge mechanism comprising a first side, a second side opposite to the first side, and a base, wherein the base comprises a first arc-shaped groove;

a first housing disposed on the first side and comprising a first appearance surface;

a second housing disposed on the second side, wherein the first housing and the second housing are configured to unfold and fold relative to each other via the hinge mechanism;

a flexible display configured to continuously cover the first housing, the second housing, and the hinge mechanism, fastened to the first housing and the second housing, and located away from the first appearance surface; and an end cover comprising a first accommodating groove, wherein the first accommodating grove comprises a first groove surface and accommodates at least a part of the base, wherein at least a part that is of the first housing and that is close to the base is configured to rotate in the first arc-shaped groove when the foldable electronic device is switched between a folded state and an unfolded state, wherein the first appearance surface is in a first lap joint with the first groove surface, wherein the base comprises a third side and a fourth side, wherein the hinge mechanism further comprises a main shaft, wherein the main shaft module comprises:

a first rotating assembly located on the third side and comprising a first support plate configured to rotatably couple to the base and fasten to the first housing; and a second rotating assembly located on the fourth side and comprising:

a housing mounting bracket fastened to the second housing; and a first support arm configured to rotatably couple to the base and slidably couple to the housing mounting bracket, wherein the first support plate comprises a notch, wherein the first rotating assembly further comprises:

a first rotating member configured to rotatably couple to the first support plate through a first rotating shaft and rotatably couple to the first support arm, wherein the first rotating member comprises a first part accommodated in the notch;

a first axis on which the first support plate is rotatably coupled to the base;

a second axis on which the first support plate is rotatably coupled to the first rotating member, wherein the first axis and the second axis are spaced apart;

a third axis on which the first support arm is rotatably coupled to the base; and a fourth axis on which the first support arm is rotatably coupled to the first rotating member, and wherein the third axis and the fourth axis are spaced apart.

2. The foldable electronic device of claim 1, wherein the second housing comprises a second appearance surface located away from the flexible display, and wherein a first spacing between the first appearance surface and the flexible display is less than a second spacing between the second appearance surface and the flexible display.

3. The foldable electronic device of claim 1, wherein the second housing comprises a second accommodating groove, wherein the second accommodating groove comprises a second groove surface, wherein the end cover further comprises a third appearance surface, and wherein the third appearance surface is located away from the base and is in a second lap joint with the second groove surface.

4. The foldable electronic device of claim 1, wherein the first support plate comprises a first plate surface configured to support the flexible display, and wherein the flexible display is bonded to the first plate surface.

5. The foldable electronic device of claim 1, wherein the first support plate comprises an end, wherein the end is rotatably coupled to the base and comprises a first arc-shaped rotating block, and wherein the first arc-shaped groove accommodates the first arc-shaped rotating block that is rotatable along an arc-shaped surface of the first arc-shaped groove.

6. The foldable electronic device of claim 1, wherein the first support arm is configured to rotate around the base, the first rotating member is configured to move toward the first support plate, the first support plate is configured to rotate around the base, and the first support plate and the first support arm are configured to rotate toward each other when the first housing and the second housing are folded relative to each other, and wherein the first rotating member configured to move toward the first support arm, the first support plate configured to rotate around the base, and the first support plate and the first support arm are configured to rotate away from each other when the first housing and the second housing are unfolded relative to each other.

7. The foldable electronic device of claim 6, wherein the first rotating assembly further comprises a first elastic piece is sleeved on the first rotating shaft, wherein the first support plate comprises a first cam surface in a first direction of the first rotating shaft, and wherein the first rotating member comprises a second cam surface and is configured to abut against the first cam surface under a first elastic force of the first elastic piece.

8. The foldable electronic device of claim 7, wherein the second rotating assembly further comprises a second support arm configured to rotatably couple to the base and slidably couple to the housing mounting bracket.

9. The foldable electronic device of claim 8, wherein the first rotating assembly further comprises:

a second rotating member configured to rotatably couple to the first support plate through the first rotating shaft and rotatably couple to the second support arm, wherein the second rotating member comprises a second part accommodated in the notch;

a fifth axis on which the second support arm is rotatably coupled to the base; and a sixth axis on which the second support arm is rotatably coupled to the second rotating member, wherein the fifth axis and the sixth axis are spaced apart, wherein the second support arm is configured to rotate around the base, the second rotating member is configured to move toward the first support plate, the first support plate is configured to rotate around the base, and the first support plate and the second support arm are configured to rotate toward each other when the first housing and the second housing are folded relative to each other, and wherein the second support arm is configured to rotate around the base, the second rotating member is configured to move toward the second support arm, the first support plate is configured to rotate around the base, and the first support plate and the second support arm are configured to rotate away from each other when the first housing and the second housing are unfolded relative to each other.

10. The foldable electronic device of claim 9, wherein the first support plate comprises a third cam surface in the first axial direction, and wherein the second rotating member comprises a fourth cam surface and is configured to abut against the third cam surface under the first elastic force.

11. The foldable electronic device of claim 8, wherein the first support arm and the second support arm are rotatably coupled to the base through a second rotating shaft.

12. The foldable electronic device of claim 11, wherein the second rotating assembly further comprises a second elastic piece sleeved on the second rotating shaft, wherein the first support arm comprises a fifth cam surface in a second axial direction of the second rotating shaft, wherein the fifth cam surface is disposed facing the second support arm, wherein the base further comprises a first cam member configured to rotatably couple to the first support arm through the second rotating shaft and couple to the base through a third rotating shaft, and wherein the first cam member comprises a sixth cam surface disposed away from the second support arm and abutting against the fifth cam surface under a second elastic force of the second elastic piece.

13. The foldable electronic device according to claim 12, wherein the second support arm comprises a seventh cam surface in the second axial direction, wherein the seventh cam surface is disposed facing the first support arm; wherein the base further comprises a second cam member configured to rotatably couple to the second support arm through the second rotating shaft and couple to the first cam member through the third rotating shaft, and wherein the second cam member comprises an eighth cam surface disposed away from the first support arm and abutting against the seventh cam surface under the second elastic force.

14. The foldable electronic device of claim 13, wherein the second rotating shaft comprises a first end and a second end, wherein the third rotating shaft comprises a third end and a fourth end, and wherein the base further comprises:

a first damping support that abuts against the first cam member, wherein the first end and the third end are clamped to the first damping support; and a second damping support that abuts against the second cam member, wherein the second end and the fourth end are clamped to the second damping support.

15. The foldable electronic device according to claim 14, wherein the second damping support comprises a ninth cam surface in the second axial direction, wherein the ninth cam surface is disposed facing the second support arm, and wherein the second support arm comprises a tenth cam surface disposed away from the first support arm and configured to abut against the ninth cam surface under the second elastic force.

16. The foldable electronic device of claim 14, wherein the base further comprises a third elastic piece sleeved on the third rotating shaft, and wherein the first cam member is configured to abut against the first damping support and the second cam member abuts against the second damping support under a third elastic force of the third elastic piece.

17. The foldable electronic device of claim 12, wherein the second rotating shaft comprises a first end and a second end, wherein the third rotating shaft comprises a third end and a fourth end, and wherein the hinge mechanism further comprises:

a first limiting sheet clamped to the first end and the third end; or a second limiting sheet clamped to the second end and the fourth end.

18. The foldable electronic device of claim 8, wherein the first support plate comprises a first plate surface, wherein the base comprises a bearing surface configured to support the flexible display, wherein a first included angle between the first plate surface and the bearing surface is greater than a second included angle between a second plate surface and the bearing surface to form, among the first plate surface, the second plate surface, and the bearing surface, a display accommodating space for accommodating a bendable part of the flexible display, and wherein the second rotating assembly further comprises:

a second support plate configured to rotatably couple to the housing mounting bracket and comprising the second plate surface configured to support the flexible display; and a swing arm configured to rotatably couple to the base and slidably couple to the housing mounting bracket, wherein the swing arm comprises a first rotation axis parallel to a second rotation axis of the first support arm, wherein the housing mounting bracket comprises:

a first sliding groove extending in a first direction, wherein the first support arm is slidable in the first sliding groove; and a third sliding groove extending in a second direction wherein the swing arm is slidable in the third sliding groove, wherein a first projection along the first direction in a first cross section is not parallel to a second projection along the second direction in the first cross section, and wherein the first cross section is a reference plane perpendicular to the first rotation axis and the second rotation axis.

19. The foldable electronic device of claim 18, wherein the housing mounting bracket further comprises a second sliding groove extending in the first direction, and wherein the second support arm is slidable in the second sliding groove.

* * * * *